US011241661B2

(12) United States Patent
Enomura

(10) Patent No.: US 11,241,661 B2
(45) Date of Patent: Feb. 8, 2022

(54) STIRRER

(71) Applicant: M. TECHNIQUE CO., LTD., Izumi (JP)

(72) Inventor: Masakazu Enomura, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 0 days.

(21) Appl. No.: 17/255,638

(22) PCT Filed: May 27, 2019

(86) PCT No.: PCT/JP2019/020976
§ 371 (c)(1),
(2) Date: Dec. 23, 2020

(87) PCT Pub. No.: WO2020/213177
PCT Pub. Date: Oct. 22, 2020

(65) Prior Publication Data
US 2021/0260540 A1    Aug. 26, 2021

(30) Foreign Application Priority Data

Apr. 15, 2019  (WO) ............... PCT/JP2019/016233

(51) Int. Cl.
*B01F 5/06*    (2006.01)
*B01F 7/22*    (2006.01)
(Continued)

(52) U.S. Cl.
CPC .......... *B01F 5/0682* (2013.01); *B01F 5/0693* (2013.01); *B01F 7/1635* (2013.01);
(Continued)

(58) Field of Classification Search
CPC .... B01F 7/16; B01F 7/22; B01F 7/225; B01F 7/24; B01F 7/246; B01F 7/247
See application file for complete search history.

(56) References Cited

U.S. PATENT DOCUMENTS 2,541,221 A * 2/1951 Edwards ............... B01F 7/164
366/264
2,789,800 A * 4/1957 Willems ............... B01F 7/164
366/263
(Continued)

FOREIGN PATENT DOCUMENTS

DE      10 2016 202 586 A1    8/2017
DE        102016202586 A1 *   8/2017    ............... B60K 6/36
(Continued)

OTHER PUBLICATIONS

International Search Report (PCT/ISA/210) issued in PCT/JP2019/020976 dated Aug. 20, 2019.

*Primary Examiner* — Tony G Soohoo
(74) *Attorney, Agent, or Firm* — Birch, Stewart, Kolasch & Birch, LLP

(57) ABSTRACT

A stirrer is provided such that a fluid being processed can be more efficiently shown by way of the action of an intermittent jet flow and processing capacity can be improved. The stirrer concentrically includes a rotor that includes a plurality of flat vanes and that rotates, and a screen that is place around the rotor. The screen includes a plurality of slits in the circumferential direction thereof, and screen members that are positioned between adjacent slits. The fluid being processed is discharged by rotation of the rotor from the inside of the screen to the outside as an intermittent jet flow through the slits. The width of the distal working face on the distal end of the vane in the rotational direction is smaller than the width of the basal end of the vane in the rotational direction.

20 Claims, 12 Drawing Sheets

(51) Int. Cl.
  *B01F 7/24* (2006.01)
  *B01F 7/16* (2006.01)
(52) U.S. Cl.
  CPC .............. *B01F 7/22* (2013.01); *B01F 7/225* (2013.01); *B01F 7/24* (2013.01); *B01F 7/246* (2013.01); *B01F 7/247* (2013.01); *B01F 2215/0422* (2013.01); *B01F 2215/0431* (2013.01)

(56) References Cited

U.S. PATENT DOCUMENTS

| | | | | |
|---|---|---|---|---|
| 2,985,389 A * | 5/1961 | Willems | ............... | B01F 7/00608 241/46.06 |
| 3,195,867 A * | 7/1965 | Mould, Jr. | .......... | B01F 7/00758 366/305 |
| 3,251,580 A * | 5/1966 | Adams | .............. | B01F 15/00012 366/343 |
| 3,299,924 A * | 1/1967 | Hanschitz | .............. | A47J 43/044 241/282.2 |
| 3,724,765 A * | 4/1973 | Rohrbaugh | ......... | A47J 43/0705 241/46.06 |
| 3,912,236 A * | 10/1975 | Zipperer | ............. | B01F 7/00758 366/302 |
| 4,002,326 A * | 1/1977 | Brogli | ............... | B01F 15/00012 366/264 |
| 4,347,004 A * | 8/1982 | Platts | ..................... | B01F 5/104 366/137 |
| 4,405,998 A * | 9/1983 | Brison | ................. | A47J 43/0705 366/264 |
| 4,570,863 A * | 2/1986 | Knox, Jr | ................. | B02C 23/36 241/33 |
| 4,621,775 A * | 11/1986 | Abom | ................... | B02C 18/062 241/299 |
| 4,738,543 A * | 4/1988 | Seeger | ................ | B01F 15/00012 366/264 |
| 4,745,068 A * | 5/1988 | Godfrey | ............. | B01F 7/00816 366/266 |
| 4,813,617 A * | 3/1989 | Knox, Jr | ................... | B02C 9/00 241/33 |
| 4,850,699 A * | 7/1989 | Rebordosa | ............ | A47J 43/044 366/129 |
| 5,203,515 A * | 4/1993 | Stoerzbach | ......... | B01F 11/0233 241/89.3 |
| 5,522,553 A * | 6/1996 | LeClair | ............... | B02C 18/0092 241/185.6 |
| 5,731,199 A * | 3/1998 | Roggero | ................ | C12M 45/02 435/306.1 |
| 6,234,415 B1 * | 5/2001 | Liin | ...................... | D21B 1/345 241/46.11 |
| 6,398,402 B1 * | 6/2002 | Thomas | .................. | B01F 7/008 366/129 |
| 6,863,431 B2 * | 3/2005 | Yacko | ................. | B01F 7/00016 241/188.1 |
| 7,052,172 B2 * | 5/2006 | Jahn | ........................ | B01F 7/008 366/293 |
| 7,056,009 B2 * | 6/2006 | Jagle | ....................... | B01F 7/008 366/129 |
| 8,192,911 B2 * | 6/2012 | Awamura | ............. | G03G 9/0806 430/137.1 |
| 8,303,162 B2 * | 11/2012 | Jagle | ................... | B01F 13/1044 366/129 |
| 8,991,733 B2 * | 3/2015 | Fey | .......................... | D21D 5/04 241/46.17 |
| 9,545,608 B2 * | 1/2017 | Kaufmann | ........ | B01F 15/00175 |
| 9,925,503 B2 * | 3/2018 | Enomura | .............. | B01F 7/1635 |
| 9,962,666 B2 * | 5/2018 | Enomura | .................. | B01F 5/10 |
| 10,137,420 B2 * | 11/2018 | Luharuka | ............... | B01F 5/248 |
| 10,364,508 B2 * | 7/2019 | Enomura | .................. | C30B 29/16 |
| 10,478,790 B2 * | 11/2019 | Enomura | ................. | B01F 3/0807 |
| 2013/0215711 A1 * | 8/2013 | Kamiya | .................... | B01F 5/10 366/343 |
| 2013/0218348 A1 * | 8/2013 | Kamiya | .................. | B01F 5/104 700/275 |
| 2013/0226521 A1 * | 8/2013 | Kamiya | .................. | B01F 5/104 702/182 |
| 2014/0001663 A1 * | 1/2014 | Kuraki | ................ | B01F 7/00791 264/8 |
| 2014/0192614 A1 * | 7/2014 | Kamiya | ................ | B01F 7/0075 366/302 |
| 2015/0321154 A1 | 11/2015 | Enomura | | |
| 2018/0186722 A1 * | 7/2018 | Enomura | ............ | C07C 67/343 |
| 2021/0260540 A1 * | 8/2021 | Enomura | ................. | B01F 5/0693 |
| 2021/0283560 A1 * | 9/2021 | Enomura | ................. | B01F 5/0682 |

FOREIGN PATENT DOCUMENTS

| | | |
|---|---|---|
| EP | 3 275 534 | 1/2018 |
| JP | 4-114725 A | 4/1992 |
| JP | 2813673 B2 | 10/1998 |
| JP | 3123556 B2 | 1/2001 |
| JP | 5147091 B1 | 2/2013 |
| JP | 2015-85290 A | 5/2015 |
| WO | WO 2014/010094 A1 | 1/2014 |
| WO | WO 2016/152895 A1 | 9/2016 |
| WO | WO 2018/114058 A1 | 6/2018 |
| WO | WO-2018114058 A1 * | 6/2018 ............. B60K 6/365 |

* cited by examiner (A)

(B)

(A)

(B)

(C)

(A)

(B)

STIRRER

TECHNICAL FIELD

The present invention relates to improvement of a stirrer, especially a stirrer to be used for emulsification, dispersion, or mixing of a fluid to be processed.

BACKGROUND

Various stirrers have been proposed as an apparatus to carry out processing of emulsification, dispersion, or mixing of a fluid, however, today, it is required that the stirrer can satisfactorily process a fluid to be processed containing a substance having a small particle diameter such as nanoparticle.

For example, a bead mill and a homogenizer are known as a kind of widely known stirrer, emulsifier, and disperser.

There is a problem in the bead mill, however, that a crystal state in surface of particle is destructed and damaged thereby decreasing in a performance thereof. In addition, there is a big problem of generation of foreign materials as well as a high-cost problem of the beads which are frequently replaced or fed.

In a high-pressure homogenizer, problems such as unstable operation of the machine as well as a large power requirement have not been solved yet.

A rotary-type homogenizer has been conventionally used as a preliminary mixer; but, in order to carry out nano-dispersion or nano-emulsification, a finishing machine is required to further finish the particles to a nanometer

With Regard to Patent Documents

In light of these circumstances, the inventor of the present application has proposed the stirrer described in Patent Documents 1 to 4. This stirrer provides a rotor having a plurality of blades and a screen being arranged around the rotor and having a plurality of slits. By rotating the rotor and screen relative to each other, the fluid to be processed is sheared in a minute space between inner wall of the screen including slits and blades, and the fluid to be processed is discharged from inside the screen to outside as an intermittent jet flow through the slits.

In the stirrer described in Patent Documents 1 to 3, as described in "Conventional Technology" in Patent Document 2, the stirring condition thereof was changed by adjusting rotation number of an impeller (namely rotor). The invention according to Patent Document 2 proposes the stirrer in which a width of clearance between a blade tip of the rotor and the inner wall of the screen could be arbitrarily chosen; by so doing, it was intended to improve and optimize the ability according to a fluid. In Patent Document 3, it was found that the effect of atomization is rapidly increased by increasing the frequency Z (kHz) of the intermittent jet flow more than certain values; and based on this finding, it has been proposed to provide a stirrer capable of forming microparticle in a region where could not be achieved by a conventional stirrer.

In any of Patent Documents 1 to 3, width of the blade tip of the rotor in a circumferential direction and width of the slit provided on the screen in the circumferential direction are under certain constant condition (specifically, under the condition in which the both widths are almost identical, or the width of the blade tip of the rotor is fixed in the state of slightly larger than the width of the slits), the invention was attained by changing the clearance to the inner wall of the screen or changing the frequency Z (kHz) of the intermittent jet flow.

Through the development by the applicant of the present invention up to date, it has been known that process of emulsification, dispersion, or mixing is performed by generation of liquid-liquid shear force in speed interface due to the intermittent jet flow and, it is presumed that this liquid-liquid shear force works effectively to realize miniaturization of fluid to be processed, especially, extremely fine dispersion or emulsification such as nano-dispersion or nano-emulsification; but at present, the action thereof has not been fully clarified yet.

Outline of Development of the Present Invention

The inventor of the present invention has attempted to realize further fine dispersion or emulsification by facilitating miniaturization of a fluid to be processed by using the apparatus described in Patent Documents 1 to 3; however, from the point that the fluid to be processed is sheared in the minute space between the inner wall of the screen including slits and the blades, since it is considered that it is effective to increase the number of shearing per unit times to improve the efficiency of shearing, thus, the study was carried out from a viewpoint how to increase the number of the shearing per unit time.

As a means for achieving this, it is known to change the rotation number of the rotor (rotational peripheral velocity of the tip of the blade) as described in these Patent Documents. Under the condition that the rotation number of the rotor (rotational peripheral velocity of the tip of the blade) is constant, it is considered that either of increasing the number of the slit by narrowing the width of the slit, increasing the number of the blade of the rotor or both is effective.

However, in the case of generating the intermittent jet flow, when the width of the slit is made too wide, a pressure of the fluid to be processed passing through the slit decreases whereby the flow velocity of the intermittent jet flow becomes slower; on the other hand, when the width of the slit is made narrow, flow velocity of the intermittent jet flow becomes faster. However, when the width of the slit is made too narrow, pressure loss increases and a flow amount of the fluid to be processed passing thorough the slit decreases, so that the intermittent jet flow cannot be satisfactorily generated. As the result, there has been a limitation to increase the number of the slit by narrowing the width of the slit.

In addition, when the number of the slit is increased by narrowing the width of the slit, cavitation is significantly generated, and cavitation phenomenon is induced. The cavitation takes process of initial generation, growth, and bubble collapse due to increase of a pressure. When the bubbles collapse, erosion occurs with energy of several thousand atmospheric pressure. This erosion is a major cause of machine damage, and the suppression of cavitation is a very important factor.

Unfortunately, with the current flow analysis simulation technology, it is impossible to carry out accurate cavitation analysis.

On the other hand, when considering increasing the number of the blade of the rotor, if the number of the blade of the rotor is increased while keeping the state which the width of the blade is the same, the space volume between the blades decreases whereby the discharge amount of the fluid to be processed due to the blade is reduced, therefore, it causes that the width of the blade is narrowed and the number of the blade is increased. Accordingly, when the test was carried out by narrowing the width of the blade and increasing the number of the blade, contrary to the expectation, miniaturization of the fluid to be processed could not be facilitated.

In addition, processing ability of the stirrer can be improved by further increasing the rotation number of the rotor. By increasing the rotation number of the rotor, the discharge flow velocity of the fluid to be processed discharged from the inside of the screen to outside through the silt is increased thereby increasing the speed of the intermittent jet flow. In this case, the following points become problem.

The speed of sound is about 340 m/second in air at room temperature and about 1500 m/second in water; and when bubbles are mixed due to the cavitation, the speed of sound in water is significantly decreased. The speed of sound in water including bubbles with void ratio of 0.2 is 30 m/second or less; and the speed of sound in water with void ratio of 0.4 is about 20 m/second. In Patent Documents 1 to 3, it is considered that the speed of the intermittent jet flow passing through the screen is close to the speed of sound in water including the bubbles as mentioned above; and thus, when the speed of the intermittent jet flow exceeds the speed of sound, shock wave is generated to cause a damage to a machine. Therefore, it is necessary to suppress the generation of the bubbles due to the cavitation as much as possible to solve the problem of the shock wave.

Accordingly, not only increasing the number of shearing per a unit time, but also focusing on the liquid-liquid shear force due to the intermittent jet flow; and then, by improving the shear force, it is studied to promote the miniaturization of the fluid to be processed and to suppress the generation of the cavitation.

A generation mechanism of the liquid-liquid shear force due to the intermittent jet flow will be explained with referring to FIG. 8(A). When a blade 12 rotationally moves by rotation of a rotor, a pressure of the fluid to be processed increases in the front side of the blade 12 in a rotation direction. Because of this, the fluid to be processed is discharged as the intermittent jet flow from a slit 18 located in the front side of the blade 12. As a result, the liquid-liquid shear force is generated between the fluid to be processed outside a screen 9 and the fluid to be processed being discharged as the intermittent jet flow. In addition, since the jet flow is intermittent, entrained flow is less likely to occur and which is more effective. Therefore, by increasing the flow velocity of the intermittent jet flow to be discharged, the liquid-liquid shear force can be enhanced; but there is a mechanical limitation in increasing the rotation number of the rotor.

In addition, on the rear surface side of the blade 12 in the rotation direction, due to the decrease in the pressure of the fluid to be processed, a phenomenon occurs in which the fluid to be processed is sucked from the slit 18 located in the rear surface side of the blade 12. As a result, on the outside of the screen 9, the intermittent jet flow of the fluid to be processed from the slit 18 is not discharged relative to the fluid to be processed that is simply stand still, but the forward and reverse flows (discharge and suction) are generated; and thus, it is considered that due to the relative velocity difference in the interface of the both flows, the liquid-liquid shear force is generated between the unsteady fluids to be processed, as such, a water hammering action is generated because the forward and the reverse flow (discharged and suction) are not steady flows but unsteady flows. Due to the effect of this water hammering action, a collision pressure is dramatically increased as compared with the steady flow, so that a further greater shear force is generated thereby increasing processing ability.

In Patent Document 4, focusing on the liquid-liquid shear force due to the intermittent jet flow, by defining the relationship between the width of blade tip of the rotor and the width of the slit of the screen, to increase the efficiency of the intermittent jet flow was attempted.

PRIOR ART DOCUMENTS

Patent Document
Patent Document 1: Japanese Patent No. 2813673
Patent Document 2: Japanese Patent No. 3123556
Patent Document 3: Japanese Patent No. 5147091
Patent Document 4: International Patent Laid-Open Publication No. 2016/152895

DISCLOSURE OF INVENTION

Problems to be Solved by the Invention

An object of the present invention is to provide a stirrer which can more efficiently perform shearing applied to a fluid to be processed by an action of an intermittent jet flow and improving the processing capacity.

In addition, another object of the present invention is to provide a stirrer which can realize, as a result of efficient shearing, extremely fine dispersion and emulsification such as nano-dispersion and nano-emulsification.

Means for Solving the Problems

The present invention was achieved as a result of an attempt to improve the stirrer from a novel point of view to increase a relative velocity difference at an interface between forward and reverse flows (discharge and suction from a slit) of fluid to be processed caused by an intermittent jet flow. Specifically, by reviewing a shape of the blade of the rotor, it could be realized to provide a stirrer capable of increasing relative velocity difference between the forward and the reverse flows of the fluid to be processed.

Therefore, the present invention is to improve the stirrer which comprises a rotor having a plurality of plate-like blades and rotating as well as a screen laid around the rotor in which they are provided concentrically, the screen includes a plurality of slits in a circumferential direction thereof and a screen member located between the adjacent slits, and by rotating at least the rotor of the rotor and the screen, the fluid to be processed is discharged as an intermittent jet flow from the inside of the screen to the outside through the slits.

In the stirrer according to the present invention, the stirrer comprises the rotor having the plurality of the plate-like blades and rotating, a partition wall for holding a discharge pressure of the rotor, and the screen laid around the rotor, all of which are provided concentrically, a width (b) of a front-end action surface in the front-end part of the blade in the rotation direction is narrower than a width (B) of a base-end part of the blade in the rotation direction.

Further, the present invention may be implemented as that the screen forms a cylindrical shape with a circular cross-section, an opening of the plurality of slits provided on an inner wall surface of the screen is made to serve as an inflow opening, the width (b) of the front-end action surface in the front-end part of the blade in the rotation direction is wider than a width (Si) of the inflow opening in the circumferential direction.

Further, the present invention may be implemented as that the blade has the front-end action surface, a front surface which is located in a front of the front-end action surface of the blade in the rotation direction, and a back surface which is located behind the front-end action surface of the blade in the rotation direction, and the front surface and the back surface are slope-like tapered surfaces which gradually become smaller as the width between the front surface and the back surface move toward the front-end in the part more than half from the front-end side of the blade.

Still further, the present invention may be implemented as thin the front-end part of the blade is defined by the front-end action surface and a flank surface, the front-end action surface is a surface which is provided on the very front-end of the blade such that the distance between the front-end action surface and the inner wall surface of the screen is kept minute, the flank surface is a surface which is located behind the front-end action surface in the rotation direction of the blade and is provided such that the distance between the flank surface and the inner wall surface of the screen is larger than the minute distance.

In addition, the stirrer according to the present invention is characterized in that the plurality of the plate-like blades rotationally moves by the rotation of the rotor, and on the front surface side of the blade in the rotation direction, by increasing the pressure of the fluid to be processed, the fluid to be processed is discharged as the intermittent jet flow from the slit located in the front surface side of the blade, and on the back surface side of the blade, by decreasing the pressure of the fluid to be processed, the fluid to be processed is sucked from the slit located in the back side end surface of the blade, the front-end part of the blade is defined by the front-end action surface and the flank surface, the front-end action surface is the surface which is provided on the very front-end of the blade such that the distance between the front-end action surface and the inner wall surface of the screen is kept minute, the flank surface is the surface which is located behind the front-end action surface in the rotation direction of the blade and is provided such that the distance between the flank surface and the inner wall surface of the screen is larger than the minute distance, and the blade is configured so as to be faster a suction velocity of the fluid to be processed by being provided the flank surface on the front-end part as compared with case that the flank surface is not provided on the front-end part.

Although not all of the actions of the present invention have been necessarily clarified, the actions of the present invention considered by the inventor of the present invention will be explained in more detail with referring to FIG. 6 and FIG. 8.

As described above, when the blade 12 rotationally moves due to the rotation of the rotor 2, the pressure of the fluid to be processed increases on the front side of the blade 12 in the rotation direction. By this, the fluid to be processed is discharge as an intermittent jet flow from the slit 18 located on the front side of the blade 12. On the other hand, on the back side of the blade 12 in the rotation direction, the pressure of the fluid to be processed is decreased, so that the fluid to be processed is sucked through the slit 18 located on the back side of the blade 12.

At this time, in the conventional example shown by the two-dotted line in FIG. 8(A) and the conventional example shown in FIG. 8(B), the width (b) of a front-end part 21 (front-end action surface 30) of the blade 12 in the rotation direction is almost the same as the width (B) of a base end side of the blade 12 in the rotation direction and is comparatively large (wide). Due to this large (wide) width of the front-end part 21 (front-end action surface 30), a resistance (suction resistance) is generated, whereby a suction velocity of the fluid to be processed slows down.

Further, by colliding the fluid to be processed which is sucked through the slit 18 located on the back side of the blade 12 with the front-end part 21 (front-end action surface 30) of the blade 12 (or receiving the resistance (suction resistance) due to the front-end part 21 (front-end action surface 30) of the blade 12), the pressure of the fluid to be processed is extremely dropped and cavitation occurs.

In addition to this, considering the formation of the intermittent jet flow, on the front side of the blade 12 in the rotation direction, it is advantageous that the pressure of the fluid to be processed near the front-end part of the blade close to the slit 18 is high. However, as shown in FIG. 8(B), the pressure of the fluid to be processed becomes the highest in the vicinity of the central part of the blade during high-speed rotation, and thus, it can be said that there is a lot of waste in forming the intermittent jet flow (in the figure, the mark "H" indicates the part where the pressure is the highest near the central part of the blade). Similarly, on the back side of the blade 12 in the rotation direction, the pressure of the fluid to be processed is decreased, so that the fluid to be processed is sucked through the slit 18 located on the back side of the blade 12 in the rotation direction, but in the case of the conventional example, as shown in FIG. 8(B), the pressure of the fluid to be processed was the lowest near the central part of the blade (in figure, the mark "L" indicates the part where the pressure is the lowest near the central part of the blade).

On the other hand, in the stirrer according to the present invention as shown in FIGS. 6(A) and 6(B), the front-end part 21 of the blade 12 is defined by the front-end action surface 30 and the flank surface 31. Here, the front-end action surface 30 is the surface provided at the very front-end of the blade 12 such that the distance from the inner wall surface of the screen 9 is kept minute distance, and the flank surface 31 is the surface which is located behind the back side of the front-end action surface 30 in the rotation direction of the blade 12 and is provided such that the distance from the inner wall surface of the screen 9 is larger than the minute distance.

Further, the width (b) of the front-end action surface 30 in the rotation direction is narrower than the width (B) of the base-end part 32 of the blade 12 in the rotation direction, and the width (b) of the front-end action surface 30 in the front-end part 21 of the blade 12 in the rotation direction is provided so as to be larger than a width (Si) of an inflow opening 28 of the slit 18 in a circumferential direction (B>b>Si).

With such a configuration, the resistance (suction resistance) due to the front-end part 21 of the blade 12 can be reduced, and the effect of a non-stationary water hammering can be enhanced. Specifically, in the stirrer according to the present invention as shown in FIGS. 6(A) and 6(B), because the flank surface 31 is provided on the front-end part 21, a space is generated inside the screen as compared with the vase that the flank surface 31 is not provided on the frond-end part 21, and thus, the suction resistance can be reduced, whereby the flow of the fluid to be processed that is sucked from the slit 18 located on the back side end surface of the blade 12 becomes faster than in the conventional case. Namely, because the flank surface 31 is provided on the front-end part 21, the suction velocity of the fluid to be processed that is sucked from the slit 18 located on the back side of the blade 12 (hereinafter, this speed is also called suction velocity) can be increased as compared with the case where the flank surface 31 is not provided on the front-end part 21.

By being faster the flow speed of the fluid to be processed sucked through the slit 18, even if the discharge velocity of the intermittent jet flow is constant, the relative velocity difference in the interface between the forward and the backward flows (discharge and suction) of the fluid to be processed becomes large. By this, a shear force generated between the fluids to be processed can be increased. Therefore, even if the discharge velocity of the intermittent jet flow is constant, when the flow of the fluid to be processed sucked through the slit 18 that is located on the back side of the blade 12 becomes faster, the effect of the intermittent jet flow is enhanced. Further, in the stirrer according to the present invention as shown in FIGS. 6(A) and 6(B), the fluid to be processed sucked through the slit 18 is sucked while being guided by the flank surface 31 even if the fluid to be processed collides with the front-end part 21 of the blade 12, so that an extreme pressure drop can be suppressed thereby suppressing the generation of cavitation and suppressing the generation of air bubbles, and as a result, a risk of erosion due to the cavitation can also be reduced.

It is difficult to directly measure the flow velocity of the fluid to be processed, however, as will be described in Examples later, it was confirmed that the stirrer according to the present invention can remarkably promote the atomization of the fluid to be processed as compared with the conventional stirrer.

Further, in the stirrer according to another embodiment of the present invention shown by a solid line of FIG. 8(A) as well as in FIG. 8(C), the front surface 33 and the back surface 34 of the blade 12 are slope-like tapered surface s which gradually become smaller as the width between the front surface and the back surface move toward the front-end in the part more than half from the front-end side of the blade.

Considering the formation of the intermittent jet flow based on the above, since the part more than half from the front-end side of the blade is slope-like tapered surface s, the part H where the pressure of the fluid to be processed is the highest near the center part of the blade moves toward the front-end of the blade, and thus the waste at the time of the formation of the intermittent jet flow can be suppressed. Further, since the blade is tapered and the occupied volume of the blade is reduced, the discharge amount per rotation is increased and the discharge velocity of the intermittent jet flow is increased.

With regard to the suction action due to a negative pressure in the side of the back surface 34 of the blade 12, since the back surface 34 of the blade 12 is also slope-like tapered surface s, the part L where the pressure of the fluid to be processed is the lowest near the central part of the blade moves toward the front-end side of the blade, and thus, the suction force can be increased.

Accordingly, the absolute value of the difference between the forward and the reverse flows is significantly increased, and the effect of water hammering is significantly increased.

In this way, since the intermittent jet flow is easy to discharge and suck, and as a result, the generation of the cavitation can be reduced.

Further, in the stirrer according to still another embodiment of the present invention as shown in FIG. 9, the front surface 33 and the back surface 34 of the blade 12 are slope-like tapered surface s which gradually become smaller as the width between the front surface and the back surface move toward the front-end in the part more than half from the front-end side of the blade, and the front-end part 21 of the blade 12 is defined by the front-end action surface 30 and the flank surface 31, because of these, it is considered that the both work effects of the stirrer according to the embodiment of the present invention as shown in FIG. 6(A) and FIG. 6(B) and the stirrer according to the another embodiment of the present invention as shown by the solid line in FIG. 8(A) and FIG. 8(C) can be expressed.

Since there is a risk that the discharge amount of the fluid to be processed due to the blade becomes low, when the number of the plurality of the plate-like blades is less than 3, the number of the shearing per a unit time becomes too low, and when the number of the blade is increased to more than 12, the space volume between the blades decreases, as a result, it is appropriate that the number of the blade is 3 or more and 12 or less, though this number may be changed in accordance with the changes of other conditions such as the equipment size and the intended rotation number.

Although it is preferable that the screen be carried out so that diameters of the blade and the screen become smaller as the distance in the axial direction, it may be also allowed that the diameters of the blade and of the screen do not change or the diameters of the blade and of the screen become larger.

Considering the relationship between the slit and the introduction part in an axial direction, there is a tendency that a discharge amount from the slit nearer the introduction part is larger, on the other hand, the discharge amount from the slit apart from an opening for the introduction is smaller. Therefore, the discharge amount in an axial direction of the screen can be made uniform by configuring such that the diameters of the blade and the screen are made smaller as they move apart from the introduction part in an axial direction. By so doing, generation of the cavitation can be suppressed; and thus, malfunction of the machine can be reduced.

By allowing that the plurality of the plate-like blades has the same width in the rotation direction on the front-end action surface and are formed at the equal distance in the rotation direction, the fluid to be processed can be processed under more uniform condition in the rotation direction. However, this does not prevent the use of the plurality of the plate-like blades having different widths on the front-end action surface and the implementation as non-uniform distance therebetween the plurality of the plate-like blades.

The plurality of the slits has the same width in the circumferential direction and are formed at equal intervals in the circumferential direction, whereby the fluid to be processed can be processed under more uniform condition in the circumferential direction. However, this does not prevent the use of the plurality of the slits having different widths and does not prevent an embodiment as the distance between the plurality of the slits is uneven.

In the case that the screen is made not to rotate, in individual control, it is only necessary to consider the rotation number of the rotor, on the contrary, in the case that the screen is made to rotate in the opposite direction to the rotor, it can be suitable for extremely fine dispersion and emulsification such as nano-dispersion and nano-emulsification.

Effect of the Invention

In the present invention, the intermittent jet flow has further studied; and as a result, a stirrer which can more efficiently perform shearing applied to the fluid to be processed by an action of the intermittent jet flow and enable to enhance the processing performance could be provided.

In addition, as a result of the efficient shearing, a stirrer that can be realized extremely fine dispersion and emulsification such as nano-dispersion and nano-emulsification could be provided.

In addition, a stirrer that can obtain particles having a narrow particle size distribution and uniform particle diameter could be provided.

BEST MODES FOR CARRYING OUT THE INVENTION

Figure 1:
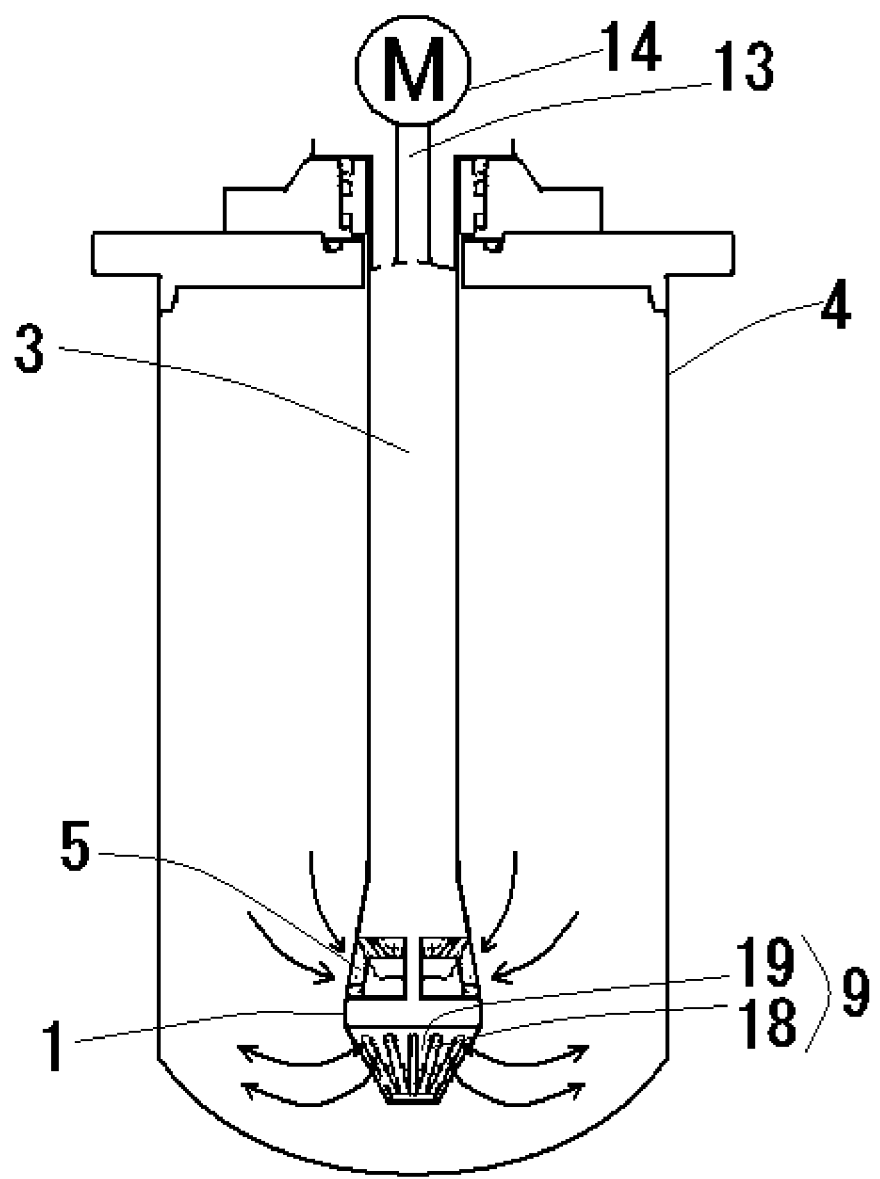
FIG. 1 This is a front view illustrating use state in the stirrer according to one embodiment of the present invention.

Hereinafter, embodiments according to the present invention will be explained with referring to the drawings. In FIG. 6 to FIG. 9 and FIG. 12, character R indicates a rotation direction.

Figure 2:
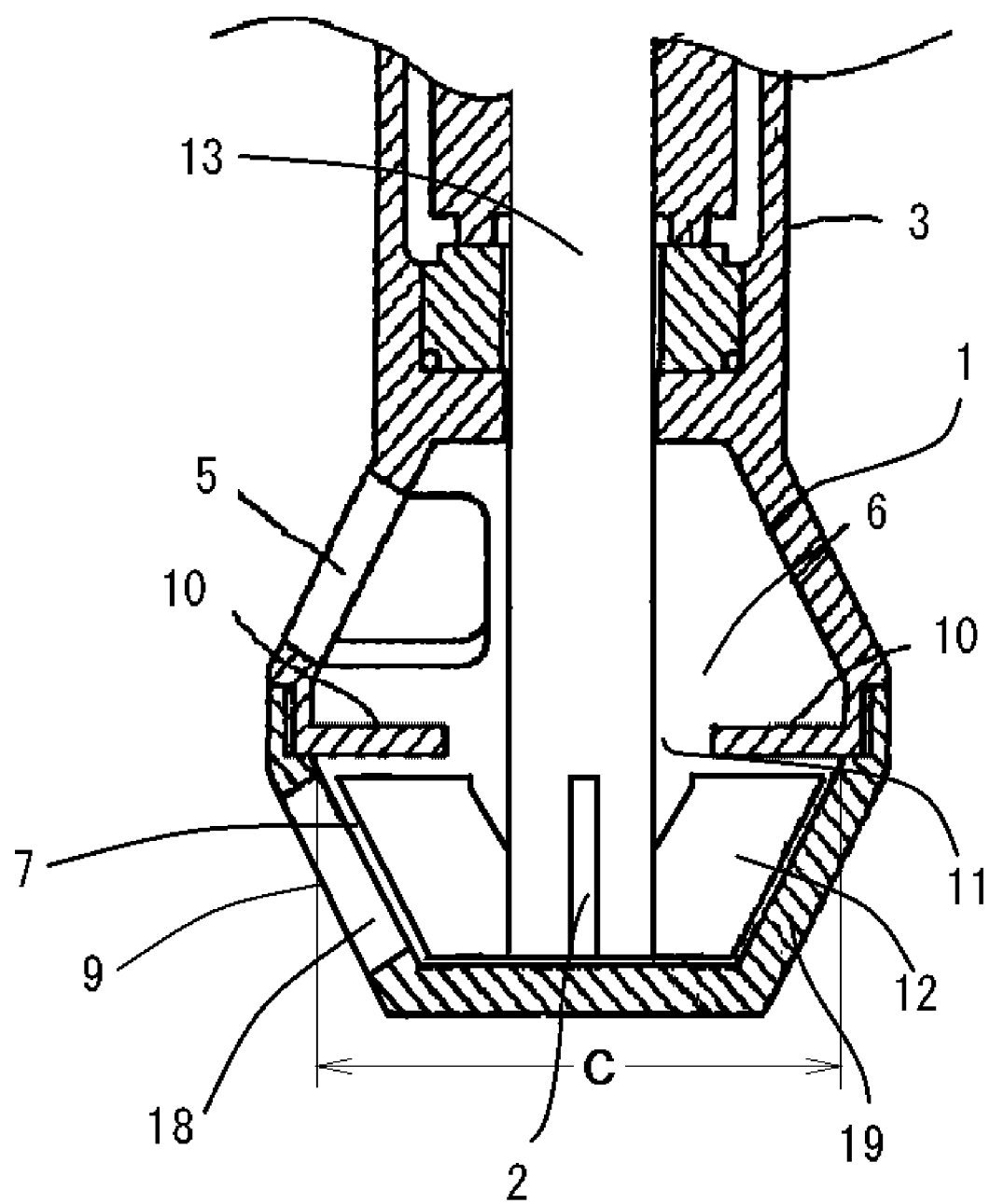
FIG. 2 This is an enlarged vertical cross-sectional view of an essential part of the stirrer.

First, with referring to FIG. 1 and FIG. 2, a basic structure of an example of a stirrer to which the present invention can be applied will be explained.

The stirrer includes a processing member 1 that is arranged in a fluid to be processed, which is scheduled to be processed such as emulsification, dispersion, or mixing, and a rotor 2 that is arranged in the processing member 1.

Figure 3:
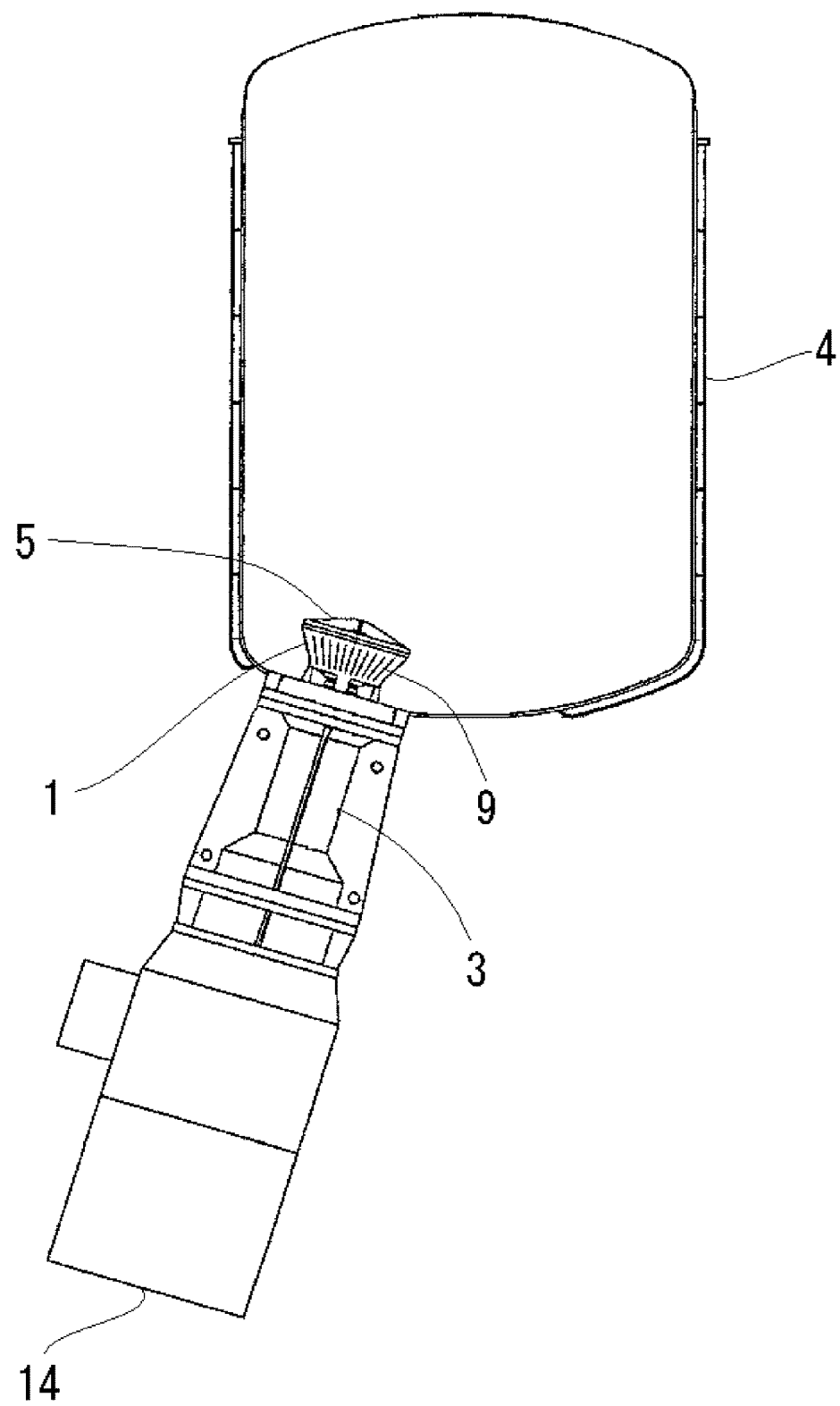
FIG. 3 This is a front view illustrating a use state in the stirrer according to another embodiment of the present invention.

The processing member 1 is a hollow housing and, by being supported by a support tube 3, is arranged in a storing vessel 4 for storing the fluid to be processed, or a flow path of the fluid to be processed. In this example, the processing member 1 is arranged in a front-end of the support tube 3 and is inserted from an upper part of the storing vessel 4 to inside of lower part thereof, but the present invention is not restricted to the example. For example, as shown in FIG. 3, it is also possible to carry out in which the processing member 1 may be supported by the support tube 3 so as to project upward from the bottom surface of the storing vessel 4.

The processing member 1 includes a suction room 6 having a suction part 5 to suck the fluid to be processed from the outside to the inside thereof, and a stirring room 7 conducting to the suction room 6. The outer circumference of the stirring room 7 is defined by a screen 9 having the plurality of slits 18.

In this specification, it will be explained that the screen 9 is composed of the slit 18 which is a void space and a screen member 19 which is an actual member located between the slit 18. Therefore, the screen 9 means an entirety that includes the slit 18 formed in the plurality of the screen members 19, and the screen member 19 means every and each actual member located between the slit 18 being adjacent. Similarly, an inner wall surface or an outer wall surface of the screen 9 means the entire inner wall surface or outer wall surface including the slit 18 formed in the plurality of the screen members 19. Further, the opening of the plurality of the slits 18 formed on the inner wall surface of the screen 9 is referred to as an inflow opening 28 and the opening of plurality of the slits 18 formed on the outer wall surface of the screen 9 is referred to as an outflow opening 29.

The suction room 6 and the stirring room 7 are partitioned by a partition wall 10 and are connected through an opening for introduction (introduction part) 11 that is provided in the partition wall 10. However, the suction room 6 is not essential; for example, without providing the suction room 6, the entire upper end of the stirring room 7 may be an opening for introduction whereby the fluid to be processed in the storing vessel 4 is introduced directly into the stirring room 7. The partition wall 10 is provided for the purpose to keep a pressure generated upon the fluid to be processed being discharged as the intermittent jet flow from the inside of the screen to the outside 9 through the slit 18.

The rotor 2 is a rotating body having the plurality of plate-like blades 12 in the circumferential direction, the rotor 2 and the screen 9 (in the case of the partition wall 10 being provided, then, the rotor 2, the screen 9 and the partition wall 10) are arranged coaxially, and they rotate while keeping a minute clearance between the blade 12 and the screen 9. To rotate the rotor 2, various rotation driving structures may be adapted; in this example, the rotor 2 is arranged at the tip of a rotation axis 13 and rotatably accommodated in the stirring room 7. More specifically, the rotation axis 13 is inserted into the support tube 3 and is further arranged so as to reach the stirring room 7 through the suction room 6 and the opening 11 of the partition wall 10; and the rotor 2 is attached to the tip thereof (lower end in the drawing). The rear end of the rotation axis 13 is connected to a rotation drive device such as a motor 14. It is preferable to use the motor 14 having a control system such as numeral control or being placed under a computer control.

In this stirrer, when the rotating blade 12 passes through the inner wall surface of the screen member 19 due to the rotation of the rotor 2, by a shear force applied to the fluid to be processed existed between them, emulsification, dispersion, or mixing is performed. At the same time, the rotation of the rotor 2 gives kinetic energy to the fluid to be processed, and the fluid to be processed passes through the slit 18 thereby further accelerated, and consequently the fluid to be processed is discharged from the stirring room 7 while forming the intermittent jet flow. Due to the intermittent jet flow, a liquid-liquid shear force is generated on interface velocity, thus processing of emulsification, dispersion, or mixing is performed.

The screen 9 has a cylindrical shape with a circular cross-section. With regard to the screen 9, it is preferable that, for example, the diameter thereof be gradually smaller as it is farther from the introduction opening 11 in axial direction (in the example of FIG. 2, toward a downward direction), like a cone shape of the surface shape. The diameter thereof may also be constant in an axial direction, but in that case, the discharge amount from the slit 18 is large near the introduction part 11 (upper part in FIG. 2); on the contrary, the discharge amount is small in a place apart from the introduction part 11 (lower part in FIG. 2). As a result, since there is a case that uncontrollable cavitation may occur which causes the risks to lead the malfunction of a machine, therefore, as shown in FIG. 1 and FIG. 2, the screen 9 is preferably the cone shape of the surface shape.

The slit 18 is defined by a front side end surface 22 and a back-side end surface 25 that are arranged with a distance in the rotation direction of the blade 12. It is shown that the slit 18 extends linearly in the axial direction of the rotation axis 13 (upward and downward directions in the drawings) but may be curved and extended such as spiral shape. Further, although the plurality of the slits 18 are formed at the same distance in the circumferential direction, they may be formed at different distances, and this does not prevent provision of the slit 18 having a plurality of shapes or sizes.

The slit 18 can be implemented by arbitrarily changing the lead angle thereof. As shown in the drawing, in addition to that the lead angle formed by the plane which is perpendicular to the rotation axis 13 and the extending direction of the slit 18 is 90 degrees, namely, linearly extending to vertical direction, it may be curved and extended in the vertical direction, such as spiral shape having a predetermined lead angle.

The blade 12 of the rotor 2 may be made so as to be linearly extended with a constant width radially from a center of the rotor 2 in a transverse section (cross section which is perpendicular to the axial direction of the rotation axis 13), and in addition, the blade may be gradually increased in width toward the outside direction, or may be narrowed, however, the conditions such as the shape and width of front-end part 21 of the blade 12 should be in accordance with the conditions described in the claims.

The base-end part 32 of the blade 12 is a part where the blade 12 is connected to the rotation axis 13. Further, in these blades 12, a lead angle of a front-end part 21 thereof can be arbitrarily changed. For example, the lead angle formed by the plane orthogonal to the rotation axis 13 and the extending direction of the front-end part 21 extends linearly in upward and downward directions at 90 degree, as well as the blade may be windingly extended to upward and downward directions, such as a spiral shape having a predetermined lead angle.

The shape of these individual composition members is such thin the front-end part 21 of the blade 12 and the slit 18 are at the same position where at least part of them is overlapped with each other in a longitude direction of the slit 18 (upward and downward directions in the drawing). Then, due to the rotation of the rotor 2, the fluid to be processed is sheared between the blade 12 and the screen member 19 in the same position where they are overlapped, and as the blade 12 rotates, a kinetic energy so as to generate the intermittent jet flow can be given to the fluid to be processed that is passing through the slit 18. In the present invention, when the relationship between the blade 12 and the slit 18 is defined, unless otherwise specifically mentioned, it means the relationship in the same position.

The distance between the screen 9 and the blade 12 (distance between the front-end action surface 30 in the front-end part 21 of the blade 12 and the inner wall surface of the screen 9 which will be described later) can be arbitrarily changed within the range which the shearing and the intermittent jet flow are generated, though usually it is preferable to have a minute distance of about 0.2 mm to about 2.0 mm. When the screen 9 having an entirely tapered shape as shown in FIG. 2 is used, this clearance can be readily adjusted by making at least any one of the stirring room 7 and the blade 12 movable.

Figure 4:
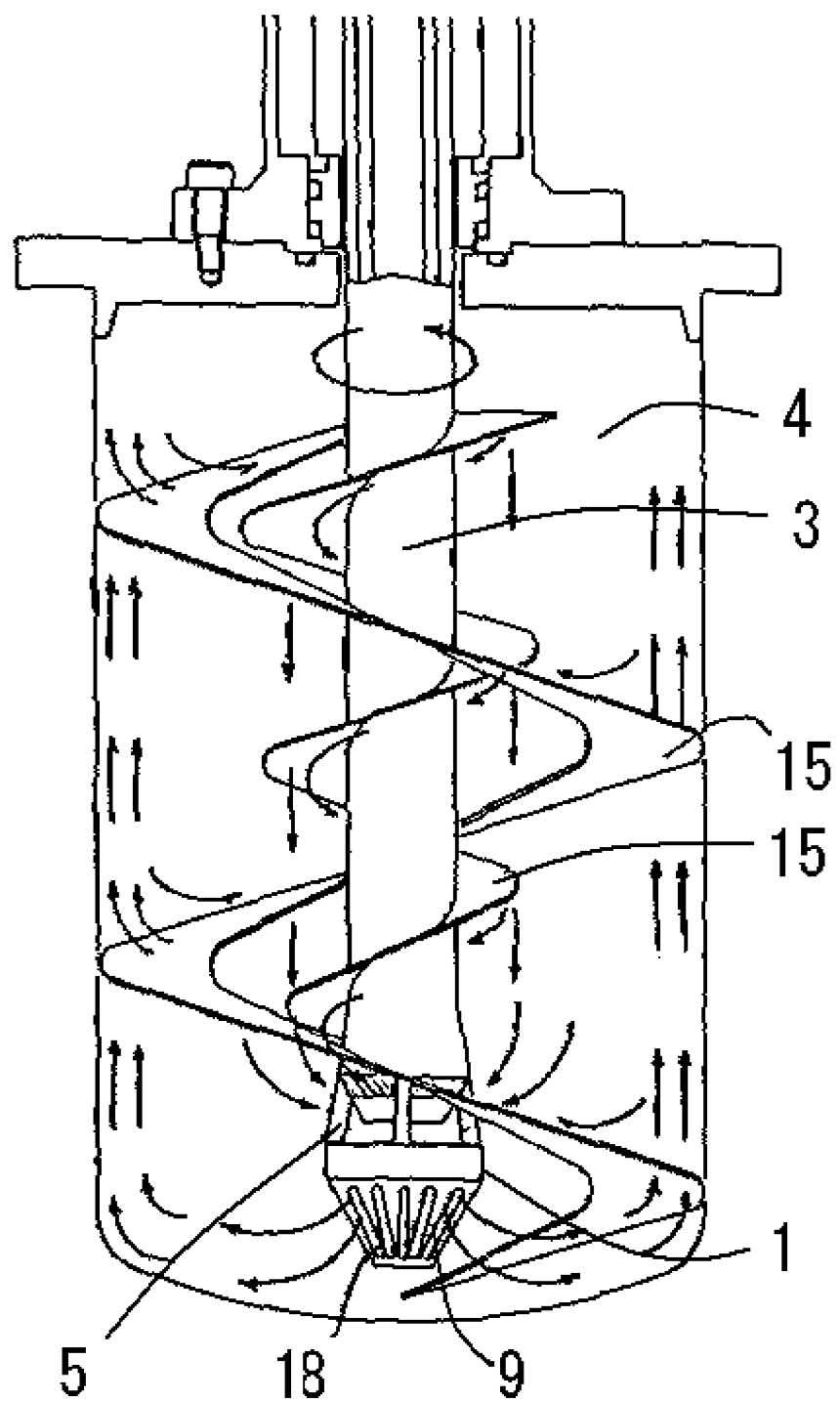
FIG. 4 This is a front view illustrating a use state in the stirrer according to still another embodiment of the present invention.
Figure 5:
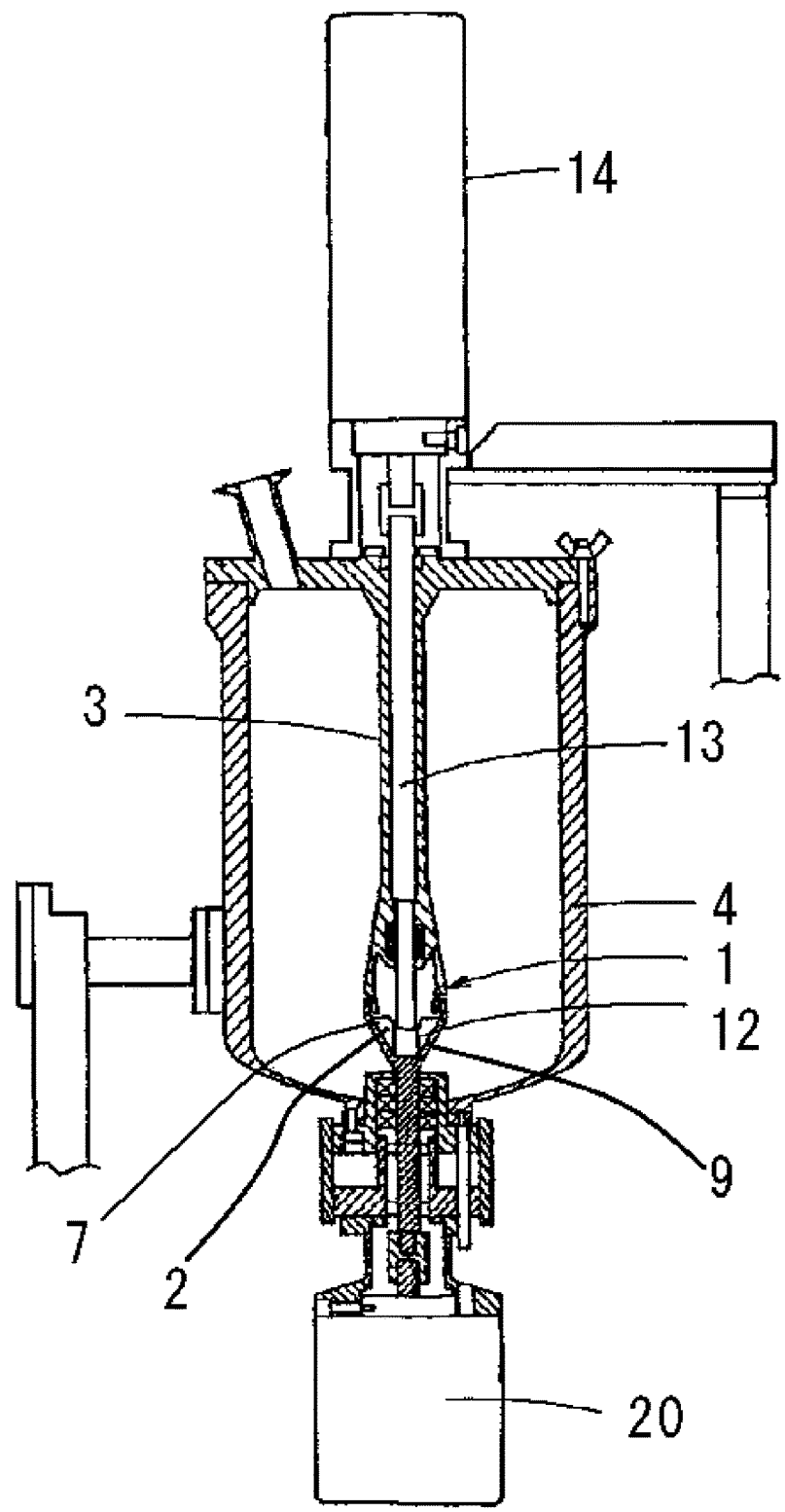
FIG. 5 This is a front view illustrating a use state in the stirrer according to further still another embodiment of the present invention.
Figure 6:
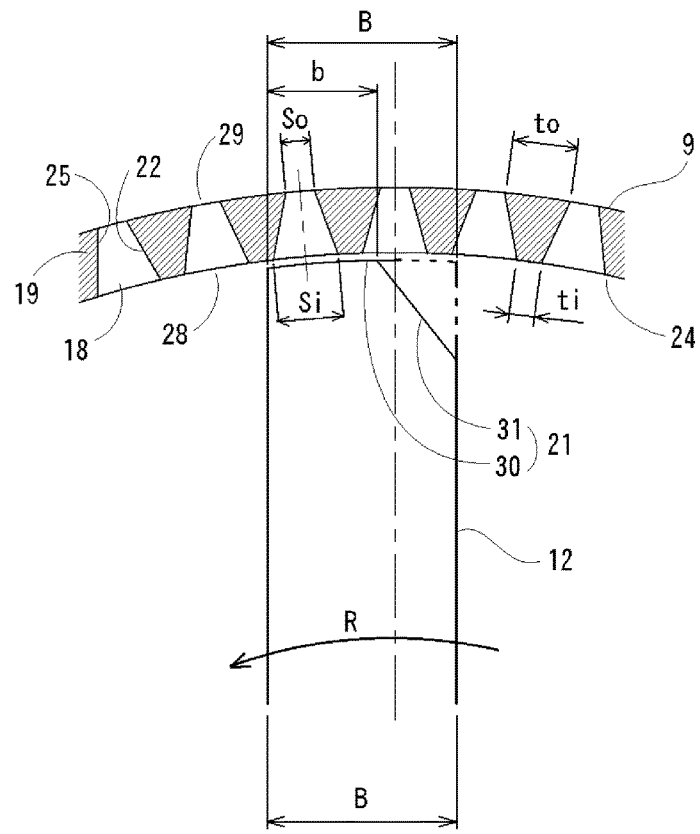
FIG. 6 (A) is an enlarged view of an essential part of the stirrer according to one embodiment of the present invention; and (B) is an enlarged view illustrating the action thereof.
Figure 6:
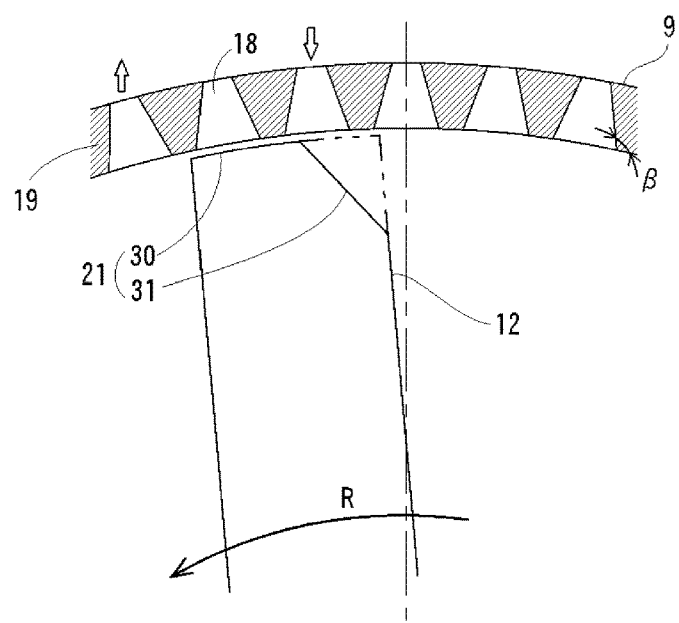

In addition, as another structure of the stirrer, those shown in FIG. 4 and FIG. 5 may be also adopted.

In addition, stirrers having other structures as illustrated in FIG. 4 and FIG. 5 may be used as well.

In the example of FIG. 4, in order to perform uniform stirring of the entire fluid to be processed in the storing vessel 4, a separate stirring apparatus is arranged in the storing vessel 4. Specifically, a stirring blade 15 for stirring the entire storing vessel 4 may be arranged so as to rotate in the same body together with the stirring room 7. In this case, the stirring blade 15 and the stirring room 7 having the screen 9 are rotated together. At that time, the rotation direction of the stirring blade 15 and of the stirring room 7 may be the same as or opposite to the rotation direction of the rotor 2. Namely, since the rotation of the stirring room 7 having the screen 9 is slower as compared with the rotation of the rotor 2 (specifically, a circumferential velocity of rotation of the screen is in the range of about 0.02 m to about 0.5 m/second), there is no substantial effect on generation of the shearing and the intermittent jet flow.

Further, in the example of FIG. 5, the stirring room 7 is rotatable with respect to the support tube 3, a rotation axis of a second motor 20 is connected to the front-end of the stirring room 7, and the screen 9 can be rotated at high speed. The rotation direction of the screen 9 is opposite to the rotation direction of the rotor 2 arranged inside the stirring room 7. By so doing, a relative rotation speed between the screen 9 and the rotor 2 is increased.

In the stirrer described above, the present invention may be applied in the way as described below.

In the stirrer according to the present invention, the process of emulsification, dispersion, or mixing is performed by generation of a liquid-liquid shear force in a speed interface by the intermittent jet flow. At this time, in the stirrer according to the embodiments of the present invention, for example, the blades 12 and the screens 9 shown in FIG. 6(A), FIG. 6(B), FIG. 7, FIG. 8(A), FIG. 8(C), FIG. 9, and FIG. 10 may be used.

In the stirrer according to the present invention, the front-end part 21 of the blade 12 of the rotor 2 is provided with the front-end action surface 30, and the width (b) of the front-end action surface 30 in the front-end part 21 of the blade 12 of the rotor 2 in the rotation direction is provided so as to be narrower than the width (B) of the base-end part 32 of the blade 12 in the rotation direction. The front-end action surface 30 is a surface that is provided on the very front-end of the blade 12 so as to maintain a minute distance of about 0.2 mm to about 2.0 mm from the inner wall surface of the screen 9. Further, it is preferable that the width (b) of the front-end action surface 30 in the front-end part 21 of the blade 12 in the rotation direction be provided so as to be wider than the width (Si) of the inflow opening 28 of the slit 18 in the circumferential direction. For example, as the blade 12 of the rotor 2, those shown in FIG. 6 to FIG. 9 can be mentioned. The front-end action surface 30 may be an arc-like shape along the inner wall surface of the screen 9 or a flat shape as long as the distance from the inner wall surface of the screen 9 is maintained in the minute distance of about 0.2 mm to about 2.0 mm.

In the embodiment according to the present invention as shown in FIG. 6(A) and FIG. 6(B), the front-end part 21 of the blade 12 in the rotor 2 is defined by the front-end action surface 30 and the flank surface 31. As described above, the front-end action surface 30 is the surface that is provided on the very front-end of the blade 12 so as to maintain the minute distance of about 0.2 mm to about 2.0 mm from the inner wall surface of the screen 9, and the flank surface 31 is the surface that is located behind the front-end action surface 30 in the rotation direction of the blade 12 and provided so that the distance from the inner wall of the screen 9 is larger than the minute distance of about 0.2 mm to about 2.0 mm. Further, the width (b) of the front-end action surface 30 in the front-end part 21 of the blade 12 in the rotation direction is provided so as to be narrower than the width (B) of the base-end part 32 of the blade 12 in the rotation direction, and the width (b) of the front-end action surface 30 in the front-end part 21 of the blade 12 in the rotation direction is provided so as to be wider than the width (Si) of the inflow opening 28 of the slit 18 in the circumferential direction (B>b>Si).

Figure 7:
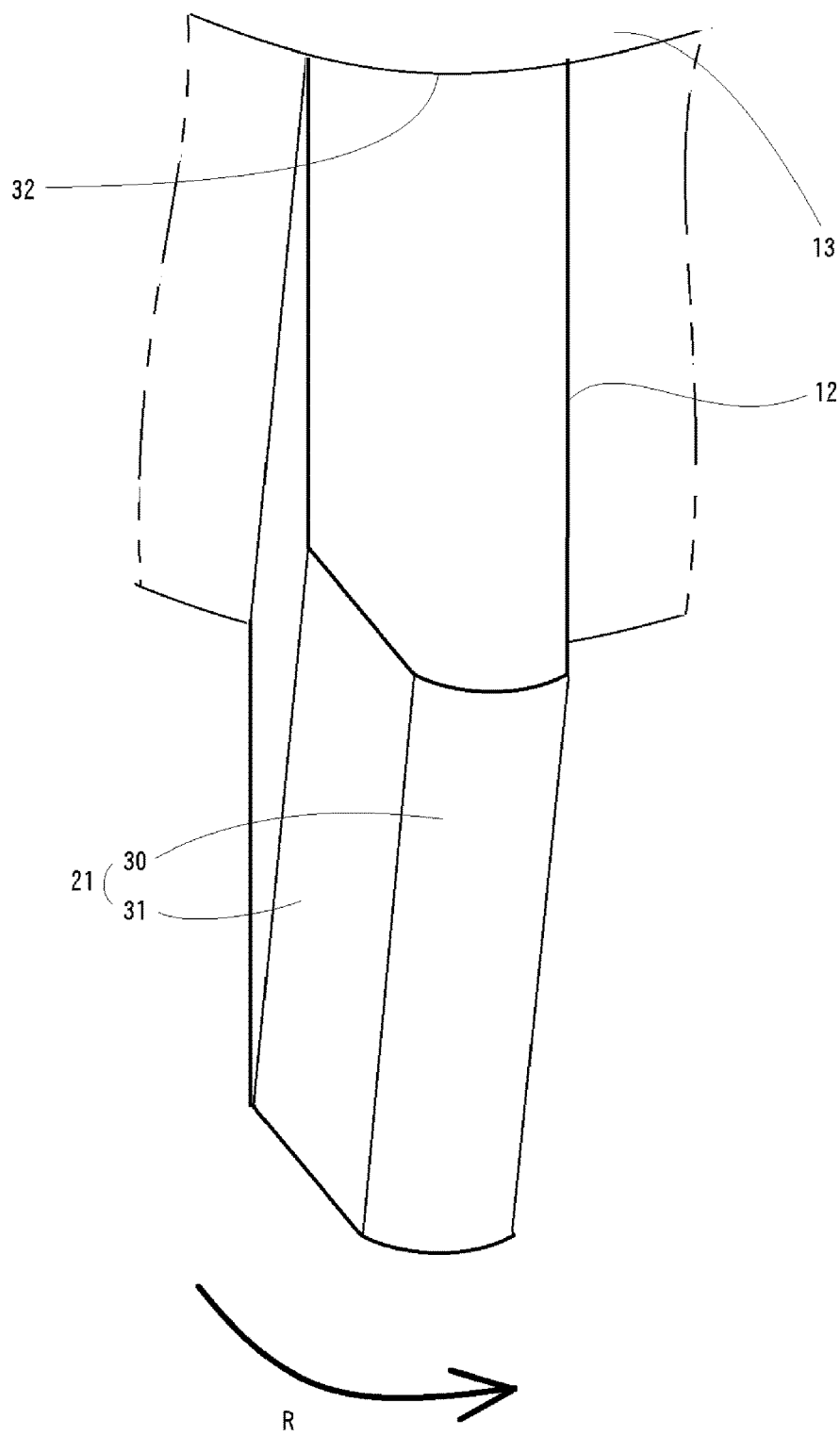
FIG. 7: This is a perspective view of an essential part of the stirrer according to an embodiment of the present invention.
Figure 8:
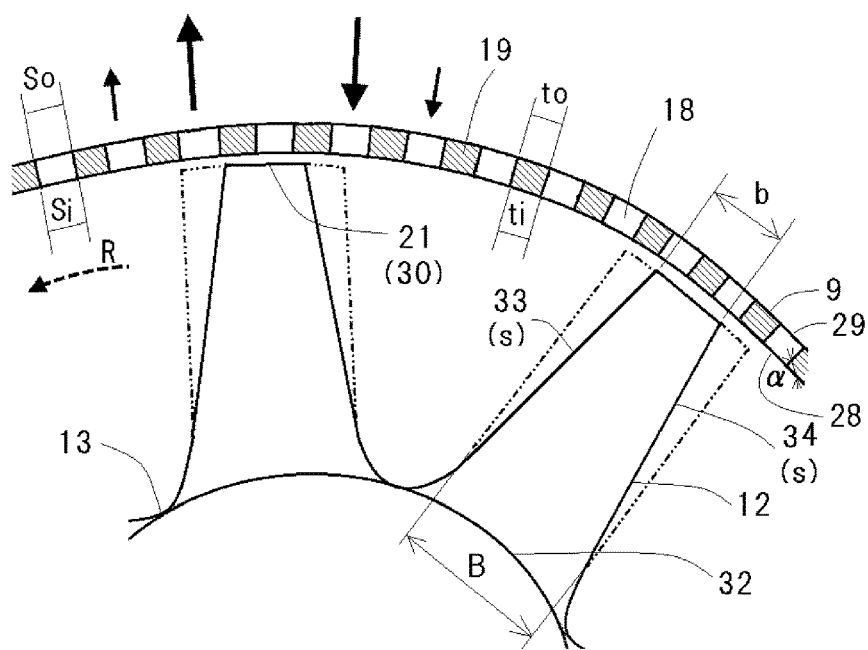
FIG. 8(A) is an enlarged view of an essential part of the stirrer according to another embodiment of the present invention (shown by a solid line) and an enlarged view of an essential part of the stirrer in a conventional example (shown by a two-dotted line)
FIG. 8(B) is an enlarged view of an essential part of the stirrer in a conventional example.
FIG. 8(C) is an enlarged view of an essential part of the stirrer according to another embodiment of the present invention.
Figure 8:
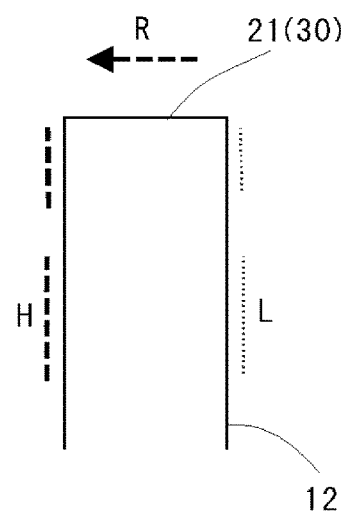
Figure 8:
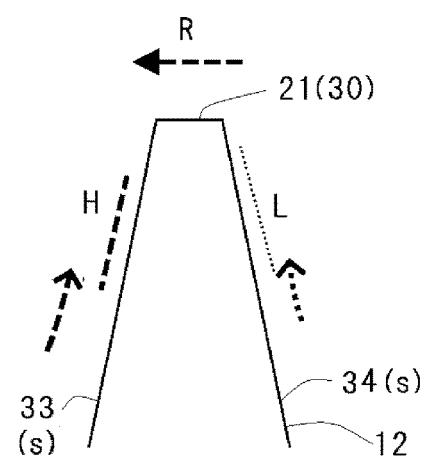

Specifically, in the example shown in FIG. 6(A) and FIG. 6(B), with respect to the blade 12 of the rotor 2 which extends from the base-end part 32 toward the outside direction and the blade 12 having the constant width in the rotation direction (the widths of the both base-end part 32 and the front-end part 21 in the rotation direction of the blade 12: B), the flank surface 31 is provided on the front-end part 21, and the flank surface 31 inclined so as to advance in the rotation direction of the blade as heading the outside direction. The part described by the two-dotted chain line in FIG. 6(A) and FIG. 6(B) shows the case where the flank surface 31 is not provided on the front-end part 21. FIG. 7 shows a perspective view of the blade 12 shown in FIG. 6(A).

Figure 9:
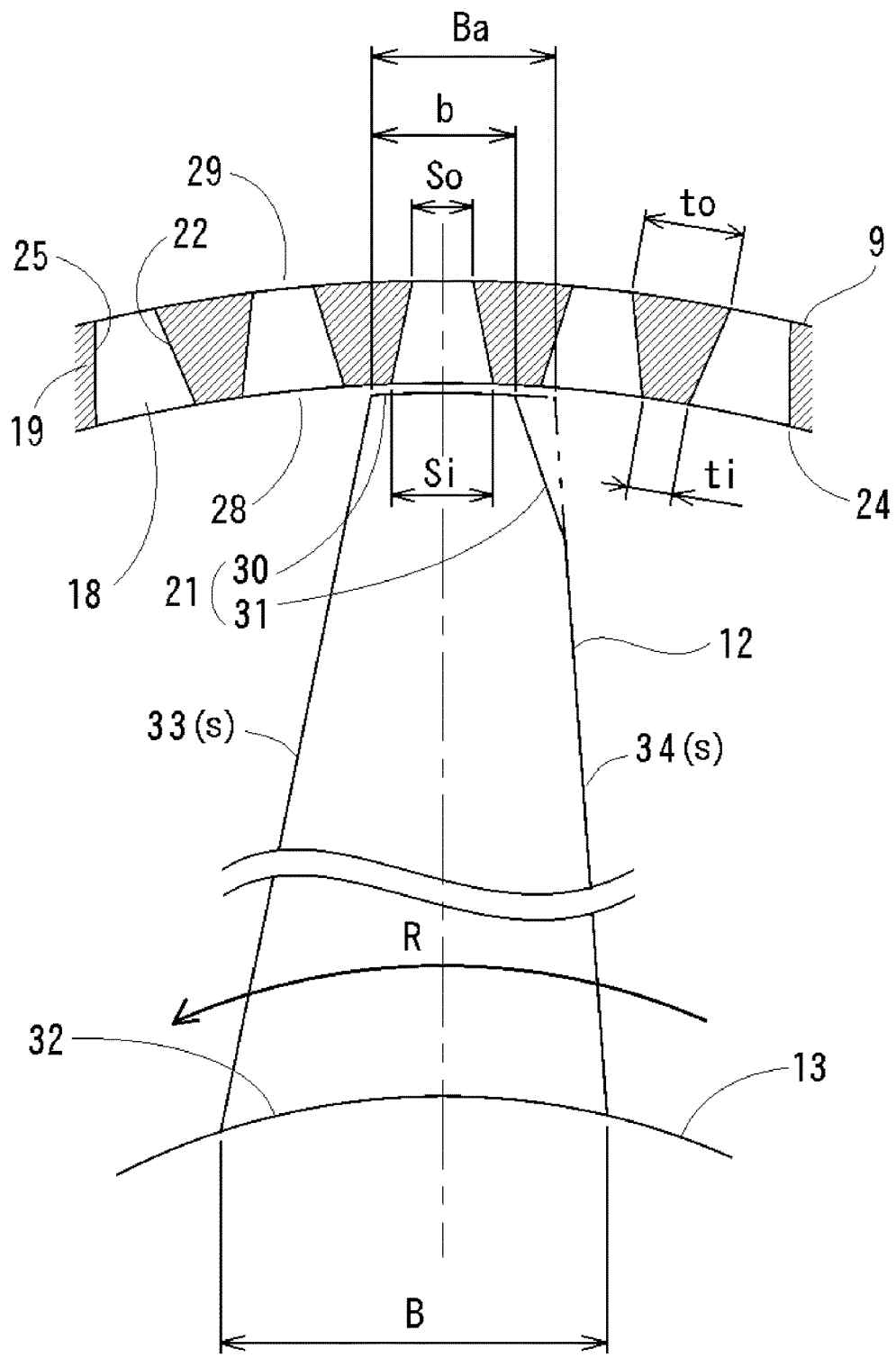
FIG. 9: This is an enlarged view of an essential part of the stirrer according to still another embodiment of the present invention.

As the flank surface 31, as shown in FIG. 6(A) and FIG. 6(B) or FIG. 9 described later, it may be inclined so as to advance in the rotation direction of the blade 12 as heading to the outside direction, or but not shown, it may be a step in which the distances of the front-end action surface 30 and of the flank surface 31 from the axial center change stepwise.

The front-end part 21 in the blade 12 of the rotor 2 has configuration defined by the front-end action surface 30 and the flank surface 31, and it is preferable thin the front-end part 21 of the blade 12 and the slit 18 be so as to be configured overall as mentioned above at the same position where they are overlapped with each other in a longitude direction of the slit 18 (upward and downward directions in the drawing), but it may be also that part of the configuration is at the same position.

In the another embodiment of the present invention as shown by the solid line in FIG. 8(A) and shown in FIG. 8(C), the front surface 33 and the back surface 34 of the blade 12 are slope-like tapered surfaces s which gradually become smaller as the width between the front surface 33 and the back surface 34 move toward the front-end in the part more than half from the front-end side of the blade 12, and the width (b) of the front-end action surface 30 in the front-end part 21 of the blade 12 in the rotation direction is provided so as to be narrower than the width (B) of the base-end part 32 of the blade 12 in the rotation direction.

Specifically, in the example shown by the solid line in FIG. 8(A) and shown in FIG. 8(C), the blade 12 of the rotor 2 extends from the base-end part 32 toward the outside direction, and the width of the blade 12 in the rotation direction is gradually narrowed as heading toward the outside direction (B: the width of the base-end part 32 in the rotation direction, b: the width of the front-end part 21 in the rotation direction).

It is preferable that the front surface 33 and the back surface 34 of the blade 12 be slope-like tapered surfaces s which gradually become smaller as the width between the front surface 33 and the back surface 34 move toward the front-end in the part more than half from the front-end side of the blade 12, and it is more preferable that tapered surfaces s on the slope be formed in the part more than ⅔ from the front-end side of the blade 12.

In the still another embodiment according to the present invention as shown in FIG. 9, the front surface 33 and the back surface 34 of the blade 12 are slope-like tapered surfaces s which gradually become smaller as the width between the front surface 33 and the back surface 34 move toward the front-end in the part more than half from the front-end side of the blade 12, and the front-end part 21 of the blade 12 is defined by the front-end action surface 30 and the flank surface 31.

Specifically, the blade 12 of the rotor 2 extends from the base-end part 32 toward the outside direction, and the width of the blade 12 in the rotation direction is gradually narrowed as heading toward the outside direction (B: width of the base-end part 32 in the rotation direction, and Ba: width of the front-end part 21 in the rotation direction), and the flank surface 31 is provided on the front-end part 21, the flank surface 31 is inclined so as to advance in the rotation direction of the blade as heading to the outside direction. The part drawn by the two-dotted chain line in FIG. 9 shows the case where the flank surface 31 is not provided on the front-end part 21. Note that, in the one shown by the solid line in FIG. 8(A) and shown in FIG. 8(C), the front surface 33 and the back surface 34 are almost symmetrical, whilst in FIG. 9, the front surface 33 is inclined at large angle. In addition, as shown in FIG. 12(D), the plate-like blade may have a twisted angle.

By adopting the shape of the blade 12 of the rotor 2 as described above, the present invention was achieved by finding being extremely effective in the point that, in the stirrer, the liquid-liquid shear force at the speed interface can be increased, whereby very fine dispersion and emulsification such as nano-dispersion and nano-emulsification can be realized.

The action of the intermittent jet flow will be explained with comparing to the conventional example described by the two-dotted chain line in FIG. 8(A) and the conventional example described in FIG. 8(B).

As described above, the intermittent jet flow is generated by the rotation of the blade 12, but to explain this in more detail, the pressure of the fluid to be processed is increased on the front side of the rotation direction of the blade 12. By this, the fluid to be processed is discharged as the intermittent jet flow from the slit 18 located on the front side of the blade 12. On the other hand, in the back side of the rotation direction of the blade 12, a pressure of the fluid to be processed decreases, so that the fluid to be processed is sucked from the slit 18 located in the back side thereof. As a result, on the outside of the screen 9, a forward and reverse flows (discharge and suction) is generated in the fluid to be processed, and by relative speed difference at the interface of the both flows, the liquid-liquid shear force is generated between the fluids to be processed.

At this time, in the conventional example shown by the two-dotted line in FIG. 8(A) and the conventional example shown in FIG. 8(B), the width (b) of a front-end part 21 (front-end action surface 30) of the blade 12 in the rotation direction is almost the same as the width (B) of a base end side of the blade 12 in the rotation direction and is comparatively large (wide). Due to this large (wide) width of the front-end part 21 (front-end action surface 30), a resistance (suction resistance) is generated, whereby a suction velocity of the fluid to be processed slows down.

Further, by colliding the fluid to be processed which is sucked through the slit 18 located on the back side of the blade 12 with the front-end part 21 (front-end action surface 30) of the blade 12 (or receiving the resistance (suction resistance) due to the front-end part 21 (front-end action surface 30) of the blade 12), the pressure of the fluid to be processed is extremely dropped and cavitation occurs.

In addition to this, considering the formation of the intermittent jet flow, on the front side of the blade 12 in the rotation direction, it is advantageous that the pressure of the fluid to be processed near the front-end part of the blade close to the slit 18 is high. However, as shown in FIG. 8(B), the pressure of the fluid to be processed becomes the highest in the vicinity of the central part of the blade during high-speed rotation, and thus, it can be said that there is a lot of waste in forming the intermittent jet flow (in the figure, the mark "H" indicates the part where the pressure is the highest near the central part of the blade). Similarly, on the back side of the blade 12 in the rotation direction, the pressure of the fluid to be processed is decreased, so that the fluid to be processed is sucked through the slit 18 located on the back side of the blade 12 in the rotation direction, but in the case of the conventional example, as shown in FIG. 8(B), the pressure of the fluid to be processed was the lowest near the central part of the blade (in figure, the mark "L" indicates the part where the pressure is the lowest near the central part of the blade).

On the other hand, in the stirrer according to the embodiment of present invention as shown in FIGS. 6(A) and 6(B), On the other hand, in the stirrer according to the present invention as shown in FIGS. 6(A) and 6(B), the front-end part 21 of the blade 12 is defined by the front-end action surface 30 and the flank surface 31. Here, the front-end action surface 30 is the surface provided at the very front-end of the blade 12 such that the distance from the inner wall surface of the screen 9 is kept minute distance, and the flank surface 31 is the surface which is located behind the back side of the front-end action surface 30 in the rotation direction of the blade 12 and is provided such that the distance from the inner wall surface of the screen 9 is larger than the minute distance, and the width (b) of the front-end action surface 30 in the front-end part 21 of the blade 12 in the rotation direction is narrower than the width (B) of the base-end part 32 of the blade 12 in the rotation direction, and the width (b) of the front-end action surface 30 in the front-end part 21 of the blade 12 in the rotation direction is provided so as to be larger than a width (Si) of an inflow opening 28 of the slit 18 in a circumferential direction (B>b>Si). With such a configuration, the resistance (suction resistance) due to the front-end part 21 of the blade 12 can be reduced, and the effect of a non-stationary water hammering can be enhanced. Specifically, in the stirrer according to the embodiment of present invention as shown in FIGS. 6(A) and 6(B), because the flank surface 31 is provided on the front-end part 21, a space is generated inside the screen as compared with the vase that the flank surface 31 is not provided on the frond-end part 21, and thus, the suction resistance can be reduced, whereby the flow of the fluid to be processed that is sucked from the slit 18 located on the back side end surface of the blade 12 becomes faster than in the conventional case. Namely, because the flank surface 31 is provided on the front-end part 21, the suction velocity of the fluid to be processed that is sucked from the slit 18 (hereinafter, this speed is also called suction velocity) can be increased as compared with the case where the flank surface 31 is not provided on the front-end part 21. By being faster the flow speed of the fluid to be processed sucked through the slit 18, even if the discharge velocity of the intermittent jet flow is constant, the relative velocity difference in the interface between the forward and the backward flows (discharge and suction) of the fluid to be processed becomes large. By this, a shear force generated between the fluids to be processed can be increased. Therefore, even if the discharge velocity of the intermittent jet flow is constant, when the flow of the fluid to be processed sucked through the slit 18 that is located on the back side of the blade 12 becomes faster, the effect of the intermittent jet flow is enhanced. Further, in the stirrer according to the embodiment of present invention as shown in FIGS. 6(A) and 6(B), the fluid to be processed sucked through the slit 18 is sucked while being guided by the flank surface 31 even if the fluid to be processed collides with the front-end part 21 of the blade 12, so that an extreme pressure drop can be suppressed thereby suppressing the generation of cavitation and suppressing the generation of air bubbles, and as a result, a risk of erosion due to the cavitation can also be reduced.

Further, in the stirrer according to another embodiment of the present invention shown by a solid line of FIG. 8(A) as well as in FIG. 8(C), the front surface 33 and the back surface 34 of the blade 12 are slope-like tapered surface s which gradually become smaller as the width between the front surface and the back surface move toward the front-end in the part more than half from the front-end side of the blade.

Considering the formation of the intermittent jet flow based on the above, since the part more than half from the front-end side of the blade is slope-like tapered surface s, the part H where the pressure of the fluid to be processed is the highest near the center part of the blade moves toward the front-end of the blade, and thus the waste at the time of the formation of the intermittent jet flow can be suppressed. Further, since the blade is tapered and the occupied volume of the blade is reduced, the discharge amount per rotation is increased and the discharge velocity of the intermittent jet flow is increased.

With regard to the suction action due to a negative pressure in the side of the back surface 34 of the blade 12, since the back surface 34 of the blade 12 is also slope-like tapered surface s, the part L where the pressure of the fluid to be processed is the lowest near the central part of the blade moves toward the front-end side of the blade, and thus, the suction force can be increased.

Accordingly, the absolute value of the difference between the forward and the reverse flows is significantly increased, and the effect of water hammering is significantly increased.

In this way, since the intermittent jet flow is easy to discharge and suck, and as a result, the generation of the cavitation can be reduced.

Further, in the stirrer according to still another embodiment of the present invention as shown in FIG. 9, the front surface 33 and the back surface 34 of the blade 12 are slope-like tapered surface s which gradually become smaller as the width between the front surface and the back surface move toward the front-end in the part more than half from the front-end side of the blade, and the front-end part 21 of the blade 12 is defined by the front-end action surface 30 and the flank surface 31, because of these, it is considered that the both work effects of the stirrer according to the embodiment of the present invention as shown in FIG. 6(A) and FIG. 6(B) and the stirrer according to the another embodiment of the present invention as shown by the solid line in FIG. 8(A) and FIG. 8(C) can be expressed.

With Regard to the Screen

The screen 9, as described above, may be carried out as that the diameter of the tapered shape or the like changes. In the present invention, when the inner diameter changes, unless otherwise specifically mentioned, the maximum inner diameter means the maximum inner diameter (c) of the screen 9 in the same position in which the front-end part 21 of the blade 12 and the slit 18 are overlapped with each other in the longitude direction of the slit 18.

The slit 18 may be extended parallel to the axial direction of the rotation axis of the rotor 2 or may have an angle with respect to the axial direction such as one extending in spiral shape. In any cases, in the present invention, unless otherwise specifically mentioned, the width of the slit 18 in the circumferential direction is a length of the screen 9 in the circumferential direction in the same position in which the front-end part 21 of the blade 12 and the slit 18 are overlapped with each other in the longitude direction of the slit 18 (in other words, a direction perpendicular to the axial direction of the rotation axis of the rotor 2). A position of the slit 18 in the axial direction of the rotation axis of the rotor 2 is not restricted so far as it is in the same position, though it is preferably at least the position where the axial direction of the rotation axis 13 is the maximum inner diameter (c) of the screen 9. As an Example of the width of the slit 18 in the circumferential direction, the width (Si) of the inflow opening 28 in the circumferential direction and the width (So) of the outflow opening 29 in the circumferential direction can be mentioned.

Figure 10:
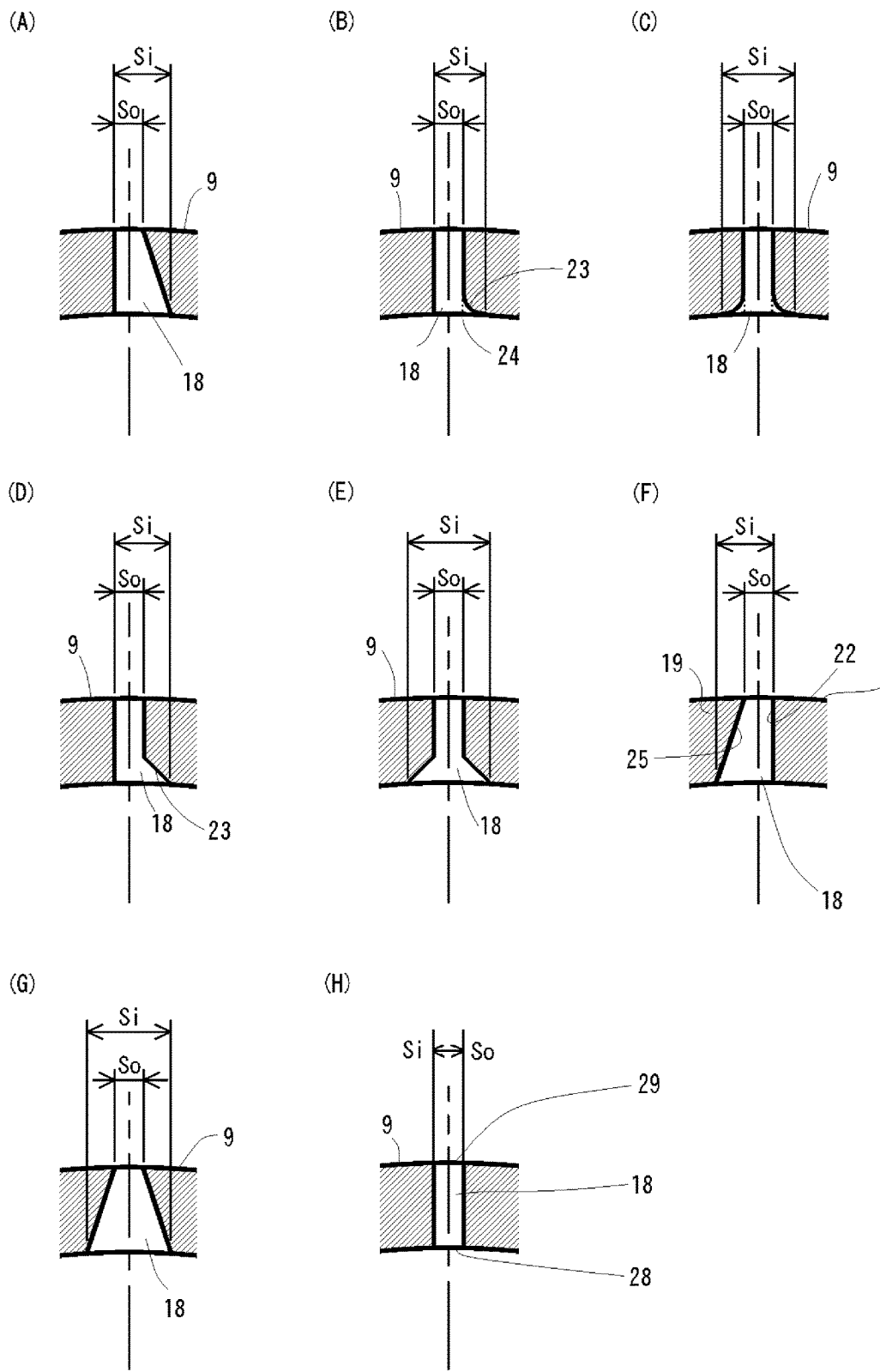
FIG. 10(A) to 10(H) are enlarged views of essential parts of the stirrers according to an embodiment of the present invention.

The width of the slit 18 in the circumferential direction, for example, as shown in FIG. 8(A) and FIG. 10(H), may be the same as the width (So) of the outflow opening 29 in the circumferential direction and the width (Si) of the inflow opening 28 in the circumferential direction, or as shown in FIG. 6(A), FIG. 6(B), FIG. 9, and FIG. 10(A) to FIG. 10(G), the width (So) of the outflow opening 29 in the circumferential direction may be provided so as to be narrower than the width (Si) of the inflow opening 28 in the circumferential direction. When the width (So) of the outflow opening 29 in the circumferential direction is set so as to be narrower than the width (Si) of the inflow opening 28 in the circumferential direction, it is preferable since the flow velocity of the intermittent jet flow passing through the screen 9 is accelerated due to a nozzle effect. Further, in FIG. 6(A), FIG. 6(B), FIG. 9, and FIG. 10(G), in addition to providing the width (So) of the outflow opening 29 in the circumferential direction being narrower than the width (Si) of the inflow opening 28 in the circumferential direction, the slit in which the entire front side end surface 22 defining the slit 18 is inclined forward in the rotation direction of the blade 12 as well as the entire back side end surface 25 also defining the slit 18 is inclined backward in the rotation direction of the blades 12 is shown, however, as shown in FIGS. 10(A), 10(D), and 10(E), in addition to providing the width (So) of the outflow opening 29 in the circumferential direction being narrower than the width (Si) of the inflow opening 28 in the circumferential direction, when at least an area 23 on the inflow side of the slit 18 in the front-end side surface 22 is inclined forward in the rotation direction of the blade 12, an edge 24 of the inflow opening 28 which is composed of the screen member 19 of the screen and the front-end side surface 22 becomes the edge of an obtuse angle ($\beta$), and as compared to the edge of almost right angle ($\alpha$) which is the edge of the inflow opening 28 in the slit as shown in FIG. 8(A) and FIG. 10(H), the extreme pressure drop in the edge 24 of the inflow opening is reduced and the fluid to be processed is effectively converted to the jet flow. Further, as a matter of course, not only a pressure loss of the fluid to be processed is reduced, and the generation of the cavitation is suppressed, but also generation of bubbles is suppressed. As a result, since the velocity of the intermittent jet flow that is discharged from the inside to the outside of the screen 9 thorough the slit 18 becomes faster than the conventional one, and a relative velocity difference at the interface between the forward flow and the backward flow (discharge and suction) of the fluid to be processed is increased, it is preferable because a shear force generated between these flows of the fluid to be processed can be increased. As shown in FIGS. 10 (B) and 10 (C), even the embodiments of the slit 18 having the edge 24 and the edge 27 of the inflow opening 28 are rounded, it is included in the embodiment in which at least the area 23 on the inflow side into the slit 18 of the front-end surface 22 is inclined forward in the rotation direction of the plurality of blades 12.

Based on this point, by combining the shape of the blade 12 of the rotor 2 with the cross-sectional shape of the slit 18, the discharge velocity of the intermittent jet flow can be increased and the suction velocity of the fluid to be processed can be increased as compared with the conventional case, thus, the relative speed difference at the interface between the forward and reverse flows (discharge and suction) of the fluid to be processed increases, thereby enabling to increase the shear force generated between the fluids to be processed.

The width (So) of the outflow opening 29 in the circumferential direction is preferably in the range of 0.2 to 4.0 mm, and more preferably in the range of 0.5 to 3.0 mm, though the width may be arbitrarily changed on the condition that the intermittent jet flow is generated.

The width of the screen member 19 in the circumferential direction (in other words, the distance in the circumferential direction between the slits 18 being adjacent with each other) can be arbitrarily changed. As the illustrative example of the width of the screen member 19 in the circumferential direction, it includes the width (ti) of the inner wall surface of the screen member 19 in the circumferential direction and the width (to) of the outer wall surface of the screen member 19 in the circumferential direction, the width (ti) of the inner wall surface of the screen member 19 in the circumferential direction may be the same with the width (to) of the outer wall surface of the screen member 19 in the circumferential direction, or they may be different. When the width (ti) of the inner wall surface of the screen member 19 in the circumferential direction and the width (to) of the outer wall surface of the screen member 19 in the circumferential direction are different, the width (to) of the outer wall surface of the screen member 19 in the circumferential direction is preferably in the range of 1 to 15 times, more preferably in the range of about 2 to about 10 times, relative to the width (So) of the outflow opening 29 in the circumferential direction. When the width (to) of the outer wall surface of the screen member 19 in the circumferential direction is made too wide, the number of shearing is reduced which leads to a decrease in the amount of the processing performance, or when this width is made too narrow, this may be substantially the same as the slit 18 being continuous, or a mechanical strength may be significantly reduced.

With Regard to the Rotor

As described above, the rotor 2 is a rotating body having a plurality of the plate-like blades 12.

As described above, the width (b) of the front-end action surface 30 in the front-end part 21 of the blade 12 of the rotor 2 in the rotation direction may be provided so as to be narrower than the width (B) of the base-end part 32 of the blade 12 in the rotation direction, and the width (b) of the front-end part 21 of the blade 12 in the rotation direction is preferably provided so as to be wider than the width (Si) of the inflow opening in the circumferential direction. When the width b of the front-end action surface 30 in the front-end part 21 of the blade 12 of the rotor 2 in the rotation direction is narrower than the widths (Si and So) of the slit 18 in the circumferential direction, particularly when the width b is narrower than the width (Si) of the inflow opening in the circumferential direction, it is not preferable in view of generation of the intermittent jet flow.

Preferable Application Condition

The numerical conditions of the screen 9, the slit 18, and the rotor 2 to which the preset invention can be applied, and which are considered to be suitable for mass production with the current technological capabilities are as follows.
Maximum inner diameter (c) of the screen 9: 30 to 500 mm (however, maximum diameter in the same position in which the front-end part 21 of the blade 12 and the slit 18 are overlapped with each other in the longitude direction of
Rotation number of the screen 9: 15 to 390 rotations/second
Number of the slit 18: 12 to 500
Maximum outer diameter of the rotor 2: 30 to 500 mm
Rotation number of the rotor 2: 15 to 390 rotations/second Needless to say, these numerical conditions are merely shown as one example, for example, with progress of technologies such as rotation control in future, the present invention does not exclude the adoption of the conditions other than the above conditions.

EXAMPLES

Hereinafter, the present invention will be explained more specifically by showing Examples and Comparative Examples. However, the present invention is not restricted to the Examples described below.

Figure 12:
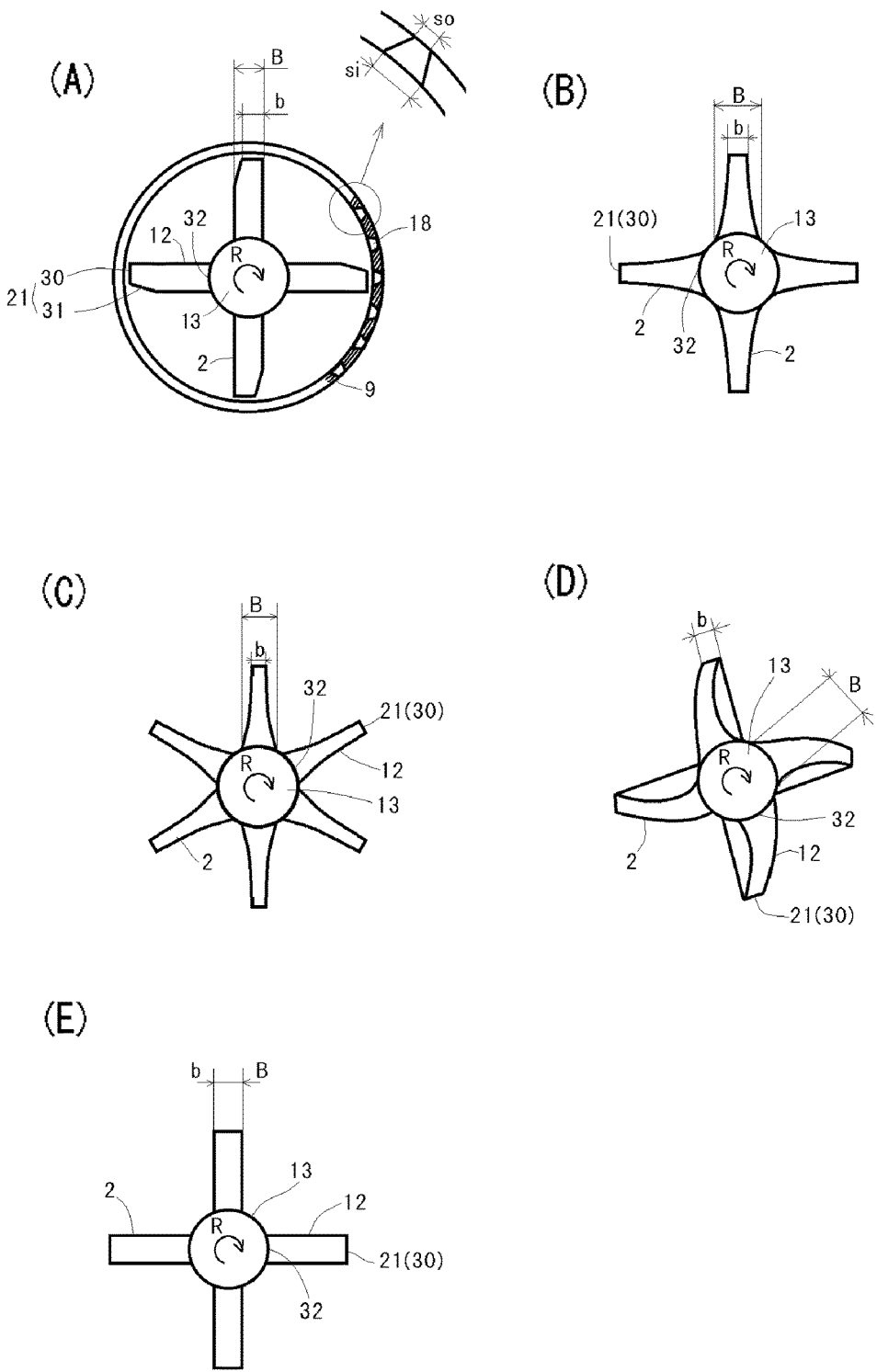
FIG. 12: (A) to (E) are enlarged views of essential parts of the stirrers used in Examples and Comparative Examples of the present invention.

The shapes of the blade 12 of the rotor 2 used in Examples are shown in FIG. 12(A) to FIG. 12 (D), and the shape of the blade 12 of the rotor 2 used in Comparative Examples is shown in FIG. 12 (E). The shape of the cross-sectional view of the slit 18 in the screen 9 used in the Examples and the Comparative Examples is provided such that the width (So) of the outflow opening 29 in the circumferential direction may be narrower than the width (Si) of the inflow opening 28 in the circumferential direction, and So is 0.8 mm and Si is 2.0 mm, which is shown only in FIG. 12(A).

More specifically, in FIG. 12(A), the blade 12 of the rotor 2 used in Examples is provided with the flank surface 31 in the front-end part 21 of the blade, in FIG. 12(B) and FIG. 12(C), the width (b) of the front-end action surface 30 in the front-end part 21 of the blade 12 in the rotation direction is narrower than the width (B) of the base-end part 32 of the blade 12 in the rotation direction, in FIG. 12(B), the number of the blade is 4, and in FIG. 12(C), the number of the blade is 6.

In the rotor 2 shown in FIG. 12(D), the plate-like blade is provided with a twisted angle, the width (b) of the front-end action surface 30 in the rotation direction is narrower than the width (B) of the base-end part 32 in the rotation direction, and the number of the blade is 4. In FIG. 12(A) to FIG. 12(D), the width (b) of the front-end action surface 30 in the rotation direction is 2.4 mm, and the width (B) of the base-end part 32 in the rotation direction is 3.8 mm.

The blade 12 of the rotor 2 used in the Comparative Examples has the same width (b=B) in which the width (b) of the front-end action surface 30 in the front-end part 21 of the blade 12 in the rotation direction is the same as the width (B) of the base-end part 32 of the blade 12 in the rotation direction, the width (b) of the front-end action surface 30 in the front-end part 21 of the blade 12 in the rotation direction and the width (B) of the base-end part 32 of the blade 12 in the rotation direction shown in FIG. 12(E) are both 3.8 mm. In each of Tables described below, as the shape of the blade 12 of the rotor 2 used in Examples and Comparative Examples, when the blade shown in FIG. 12(A) is used, it is indicated in "A"; when the blade shown in FIG. 12(B) is used, it is indicated in "B"; when the blade shown in FIG. 12(C) is used, it is indicated in "C"; when the blade shown in FIG. 12(D) is used, it is indicated in "D"; and when the blade shown in FIG. 12(E) is used, it is indicated in "E".

Here, the number of the slit 18 provided on the screen 9 is 24.

Note that the each value of the width (b) of the front-end action surface 30 in the front-end part 21 of the blade 12 in the rotation direction, the width (B) of the base-end part 32 of the blade 12 in the rotation direction, the width (Si) of the inflow opening 28 of the slit 18 in the circumferential direction, and the width (So) of the outflow opening 29 of the slit 18 in the circumferential direction is a value at the maximum outer diameter of the rotor or the maximum inner diameter of the screen 9 in the same position in which the front-end part 21 of the blade 12 and the slit 18 are overlapped with each other in the longitude direction of the slit 18.

Measurement of Particle Size Distribution

In Examples other than Example 7, the particle size distribution was measured by using MT-3300 (manufactured by Nikkiso Co., Ltd.). Pure water was used as the measurement solvent, the particle refractive index was 1.81, and the solvent refractive index was 1.33. As for the result, the result of the volume distribution was used.

Figure 11:
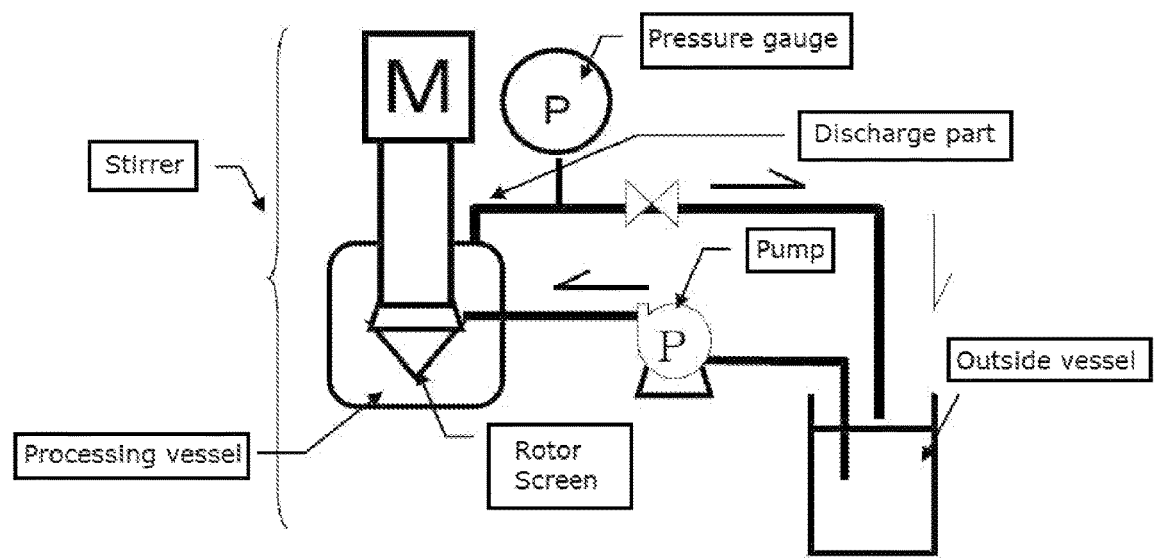
FIG. 11: This is explanatory drawings of test apparatuses of Examples and Comparative Examples of the present invention.
Figure 11:
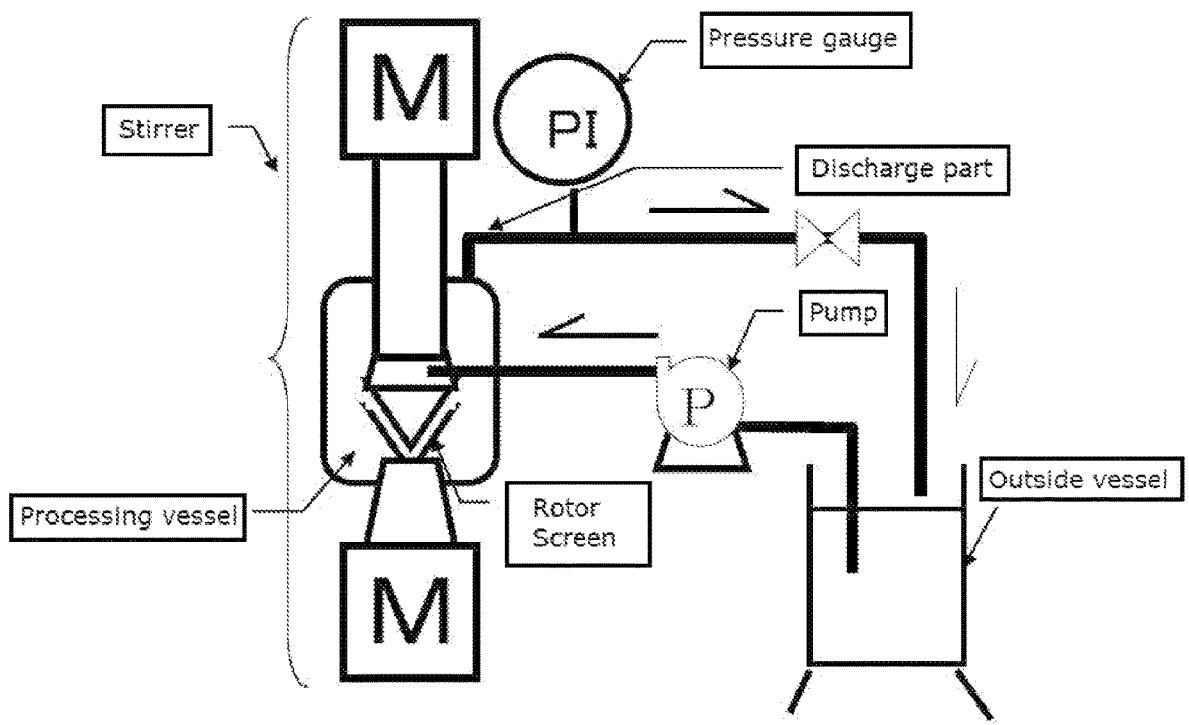

As Example 1, by using the stirrer according to the first embodiment of the present invention (FIG. 1 and FIG. 2), an emulsification experiment of liquid paraffin and pure water was carried out with the test apparatus shown in FIG. 11(A). Prescription used in the emulsification experiment was liquid paraffin at 29.4% by weight of, pure water at 68.6% by weight, and a mixture of Tween 80 at 1.33% by weight and Span 80 at 0.67% by weight as emulsifier. The fluid to be processed, which was formulated as described above, was used as preliminary mixed product, and the preliminary mixed product in an outside vessel was introduced into processing vessel 4 in which the stirrer of the present invention was laid by a pump in the test apparatus shown in FIG. 11(A), the inside of the processing vessel 4 was sealed with liquid, and by introducing the fluid to be processed into the processing vessel 4 by the pump, the fluid to be processed was discharged from the discharge part, then the fluid to be processed was discharged from screen to carry out the emulsification process by rotating the rotor 2 of the stirrer of the present application at 356.7 (rotation/second) while circulating the fluid to be processed between the processing vessel 4 and the outside vessel at 2500 g/minute.

The shape of blade 12 (4 or 6) was changed, and the value of the average particle diameter (D50) and the coefficient of variation (C.V.) of the particle diameter in the measurement result of the particle size distribution of the emulsified particles obtained after 20 minutes from the start of the emulsification process is shown in Table 1.

The coefficient of variation of the particle diameter is an index showing a degree of uniformity of the obtained particles and is obtained from the average particle diameter (D50) and the standard deviation in the particle size distribution of the particle by using the equation: Coefficient of Variation (C.V.) (%)=Standard Deviation÷Average Particle Diameter (D50)×100. When the value of the coefficient of variation is smaller, the particle size distribution of the obtained particles is narrower, and uniformity as the particle is higher.

Here, the circumferential velocity V of the rotation of the rotor 2 is V=D×π×N, when the maximum outer diameter of the rotor in the same position in which the front-end part 21 of the blade 12 and the slit 18 are overlapped with each other in the longitude direction of the slit 18 is set to D (m) and the rotation number of the rotor is set to N (rotations/second). The rotor diameter D described in Table 1 to Table 5, and Table 9 is the maximum outer diameter of the rotor 2 in the same position.

As can be seen in Table 1, when the rotation number of the rotor 2 was 356.7 (rotations/second) and the circumferential velocity of rotation of the rotor 2 was 33.6 [m/second], it was found that since the width (b) of the front-end action surface 30 in the front-end part 21 of the blade 12 in the rotation direction is narrower than the width (B) of the base-end part 32 of the blade 12 in the rotation direction, the values of D50 and of the C.V. became smaller, and it was found that the emulsified particles having fine particle diameter and narrow particle size distribution can be produced.

As for Example 2, the result obtained in the same manner as in Example 1 is shown in Table 2 except that the rotation number of the rotor 2 is 333.3 (rotations/second), and the circumferential velocity of rotation of the rotor 2 is V=31.4 (m/second).

As for Example 3, the result obtained in the same manner as in Example 1 is shown in Table 3 except that the rotation number of the rotor 2 is 300 (rotations/second), and the circumferential velocity of the rotation of the rotor 2 is V=28.3 (m/second).

As for Example 4, the result obtained in the same manner as in Example 1 is shown in Table 4 except that the rotation number of the rotor 2 is 250 (rotations/second), and the circumferential velocity of the rotation of the rotor 2 is V=23.6 (m/second).

As for Comparative Example 1, emulsification processing was carried out in the same manner as Example 1 except that the shape of the rotor 2 is the conventional type (B=b) as shown in FIG. 12(E). The result thereof is shown in Table 5.

As for Comparative Example 2, emulsification processing was carried out in the same manner as Example 2 except that the shape of the rotor 2 is the conventional type (B=b) as shown in FIG. 12(E). The result thereof is shown in Table 6.

As for Comparative Example 3, emulsification processing was carried out in the same manner as Example 3 except that the shape of the rotor 2 is the conventional type (B=b) as shown in FIG. 12(E). The result thereof is shown in Table 6.

As for Comparative Example 4, emulsification processing was carried out in the same manner as Example 4 except that the shape of the rotor 2 is the conventional type (B=b) as shown in FIG. 12(E). The result thereof is shown in Table 6.

In Example 1 and Comparative Example 1, the state of the inside of the slit 18 (hereinafter, inside of the slit) after 48 hours of continuous operation of the stirrer was visually confirmed to judge the state of erosion. The state where the erosion clearly occurred is indicated as "x", the state where mirror surface become clouded state is indicated as "Δ", and the state where the inside of the slit did not change before and after 48 hours of the operation and no erosion occurred is indicated "◯". They are shown in Table 1 and Table 5.

From the results of the above, it was founded that by being provided the width (b) of the front-end action surface 30 in the front-end part 21 of the blade 12 of the rotor 2 in the rotation direction so as to be narrower than the width (B) of the base-end part 32 of the blade 12 of the rotor 2 in the rotation direction, the average particle diameter (D50) became clearly smaller than that of the conventional type (B=b), and also the C.V. value which is an index of the particle diameter variation became smaller. It was also found that the erosion due to a cavitation could be prevented from occurring. It was also found that the occurrence of erosion due to cavitation could be prevented.

TABLE 1

Rotation number N = 356.7 [rotation/second]; Rotor diameter
D = 0.03 [m]; Circumferential velocity V = 33.6 [m/second]

| Temperature of processing vessel: 20° C. Pressure of processing vessel: 0.0 MPa | Shape of rotor | | | |
|---|---|---|---|---|
| | A | B | C | D |
| Average particle diameter [μm]/C.V. value [%] after 20 minutes | 1.95/23.1 | 1.86/22.1 | 1.74/20.3 | 1.80/21.5 |
| State of erosion inside slit (after operation of 48 hours) | ◯ | ◯ | ◯ | ◯ |

TABLE 2

Rotation number N = 333.3 [rotation/second]; Rotor diameter
D = 0.03 [m]; Circumferential velocity V = 31.4 [m/second]

| Temperature of processing vessel: 20° C. Pressure of processing vessel: 0.0 MPa | Shape of rotor | | | |
|---|---|---|---|---|
| | A | B | C | D |
| Average particle diameter [μm]/C.V. value [%] after 20 minutes | 2.29/24.8 | 2.11/23.9 | 1.95/22.7 | 2.01/23.3 |

TABLE 3

Rotation number N = 300 [rotation/second]; Rotor diameter
D = 0.03 [m]; Circumferential velocity V = 28.3 [m/second]

Temperature of processing vessel: 20° C.
Pressure of processing vessel: 0.0 MPa

| | Shape of rotor | | | |
|---|---|---|---|---|
| | A | B | C | D |
| Average particle diameter [μm]/C.V. value [%] after 20 minutes | 2.85/26.3 | 2.40/25.2 | 2.21/23.7 | 2.34/24.8 |

TABLE 4

Rotation number N = 250 [rotation/second]; Rotor diameter
D = 0.03 [m]; Circumferential velocity V = 23.6 [m/second]

Temperature of processing vessel: 20° C.
Pressure of processing vessel: 0.0 MPa

| | Shape of rotor | | | |
|---|---|---|---|---|
| | A | B | C | D |
| Average particle diameter [μm]/C.V. value [%] after 20 minutes | 4.13/40.5 | 3.51/38.9 | 3.21/35.3 | 3.32/37.3 |

TABLE 5

Rotation number N = 356.7 [rotation/second]; Rotor diameter
D = 0.03 [m]; Circumferential velocity V = 33.6 [m/second]

| | Shape of rotor |
|---|---|
| Temperature of processing vessel: 20° C. Pressure of processing vessel: 0.0 MPa | E |
| Average particle diameter [μm]/C.V. value [%] after 20 minutes | 2.38/34.1 |
| State of erosion inside slit (after operation of 48 hours) | Δ |

TABLE 6

| | Comparative Example 2 | Comparative Example 3 | Comparative Example 4 |
|---|---|---|---|
| Average particle diameter [μm]/C.V. value [%] after 20 minutes | 2.84/35.5 | 3.82/43.3 | 5.54/58.1 |

Contrary to Examples 1 to 4 and Comparative Examples 1 to 4, Examples 5 and 6 describes that not only the rotor 2 was rotated, but also the screen 9 was rotated in the opposite direction to the rotation of the rotor 2. Namely, this describes the Example according to the second embodiment in the present invention (see FIG. 5). Here, the test apparatus shown in FIG. 11(B) was used. The prescription, the circulation flow amount, and the circulation method are the same as those of Examples 1 to 4. As the shape of the cross-sectional view of the slit 18 provided on the screen 9, (Si>So) shown in FIG. 12(A) was used. The shape of the rotor in FIG. 12(C) was used.

As for Example 5, the result when the relative rotation number of the rotor 2 and the screen 9 was set to N=633 (rotations/second), and the relative circumferential velocity was set to V=69.6 m/second is shown in Table 7.

As for Example 6, the result when the relative rotation number of the rotor 2 and the screen 9 was set to N=500 (rotations/second), and the relative circumferential velocity was set to V=55.0 m/second is shown in Table 8.

Here, the circumferential velocity V (m/second) of the rotation of the rotor 2 to the screen 9 is V=D×π×N (here, N=N1+N2), when the maximum outer diameter of the rotor in the above-mentioned same position is set to D (m), the rotation number of the rotor is set to N1, the rotation number of the screen is set to N2, and the relative rotation number of the rotor and the screen is set to N (rotations/second). The rotor diameter D in the above-mentioned same position described in Table 7 to Table 8 is the maximum outer diameter.

As for Comparative Example 5, emulsification processing was carried out in the same manner as Example 5 except that the shape of the rotor is the conventional type (B=b) as shown in FIG. 12(E). The result thereof is shown in Table 7.

As for Comparative Example 6, emulsification processing was carried out in the same manner as Example 6 except that the shape of the rotor is the conventional type (B=b) as shown in FIG. 12(E). The result thereof is shown in Table 8.

In Example 5 and Comparative Example 5, the state of the inside of the slit after 36 hours of continuous operation of the stirrer was visually confirmed to judge the state of erosion. The state where the erosion clearly occurred is indicated as "x", the state where mirror surface become clouded state is indicated as "Δ", and the state where the inside of the slit did not change before and after 24 hours of the operation and no erosion occurred is indicated "O". They are shown in Table 7.

From the results of the above, it was founded that by being provided the width (b) of the front-end action surface 30 in the front-end part 21 of the blade 12 of the rotor 2 in the rotation direction so as to be narrower than the width (B) of the base-end part 32 at the blade 12 of the rotor 2 in the rotation direction, the average particle diameter (D50) of the shape of the rotor became clearly smaller than that of the conventional type (B=b), and further the C.V. value which is the index of variation of the particle diameter, became smaller. It was also found that the occurrence of erosion due to cavitation could be prevented.

TABLE 7

Rotation number N = 633 [rotation/second]; Rotor diameter
D = 0.035 [m]; Circumferential velocity V = 69.6 [m/second]

| | Example 5 Shape of Rotor C | Comparative Example 5 Shape of Rotor E |
|---|---|---|
| Temperature of processing vessel: 40° C. Pressure of processing vessel: 0.0 MPa | | |
| Average particle diameter [μm]/ C.V. value [%] after 20 minutes | 0.45/12.5 | 0.92/22.1 |
| State of erosion inside slit (after operation of 36 hours) | O | X |

TABLE 8

Rotation number N = 500 [rotations/second]; Rotor diameter
D = 0.035 [m]; Circumferential velocity V = 55.0 [m/second]

| | Example 6 Shape of Rotor C | Comparative Example 6 Shape of Rotor E |
|---|---|---|
| Temperature of processing vessel: 40° C. Pressure of processing vessel: 0.0 MPa | | |
| Average particle diameter [μm]/ C.V. value [%] after 20 minutes | 0.85/18.5 | 1.43/27.1 |

Dispersion Treatment of Pigments
Dispersion Process of Pigments

As Example 7, by using the stirrer according to the first embodiment of the present invention (FIG. 1 and FIG. 2), dispersion process of pigments was carried out with the test apparatus shown in FIG. 11(A).

Prescription for the material to be processed was 5% by weight of red pigment (C. I. Pigment Red 254) with the primary particle diameter of 10 to 35 nm, 5% by weight of BYK-2000 (manufactured by BYK Chemie GmbH) as a dispersing agent, and 90% by weight of a mixed solution of propylene glycol monomethyl ether acetate (PGMEA) and propylene glycol monomethyl ether (PGME) (PGMEA/PGME=4/1: volume ratio). The material to be processed as the fluid to be processed, which was formulated as described above, was used as preliminary mixed product, and the preliminary mixed product in the outside vessel was introduced into processing vessel 4 having the stirrer of the present invention by the pump in the test apparatus shown in FIG. 11(A), the inside of the processing vessel 4 was sealed with liquid, and by introducing the fluid to be processed into the processing vessel 4 by the pump, the fluid to be processed was discharged from the discharge part, then the fluid to be processed was discharged from screen to carry out the emulsification process by rotating the rotor 2 of the stirrer of the present application at 333.33 (rotation/second) while circulating the fluid to be processed between the processing vessel 4 and the outside vessel at 2300 g/minute. The shape of the rotor 2 shown in FIG. 12(C) was used. The value of the average particle diameter (D50) and the coefficient of variation (C.V.) of the particle diameter in the measurement result of the particle size distribution of the pigment microparticles obtained after 45 minutes from the start of the dispersion process is shown in Table 9.

As for Comparative Example 7, dispersion treatment was carried out in the same manner as Example 7 except that the shape of the rotor 2 is the conventional type (B=b) as shown in FIG. 12(E).

Measurement of Particle Size Distribution

In the following Examples, the particle size distribution was measured by using UPA-150UT (manufactured by Nikkiso Co., Ltd.). Pure water was used as the measurement solvent, the particle refractive index was 1.81, and the solvent refractive index was 1.33. As for the result, the result of the volume distribution was used.

From the results of the above, it was founded that by being provided the width (b) of the front-end action surface in the front-end part of rotor 2 in the rotation direction so as to be narrower than the width (B) of the base-end part of the rotor 2 in the rotation direction, the average particle diameter (D50) became clearly smaller than that of the conventional type (B=b), and also the C.V. value which is an index of the particle diameter variation became smaller.

TABLE 9

Rotation number N = 333.3 [rotations/second]; Rotor diameter D = 0.03 [m]; Circumferential velocity V = 31.4 [m/second]

| Temperature of processing vessel: 25° C. Pressure of processing vessel: 0.05 MPa | Example 7 Shape of Rotor C | Comparative Example 7 Shape of Rotor E |
|---|---|---|
| Average particle diameter [nm]/ C.V. value [%] after 45 minutes | 21.1/20.9 | 37.3/39.1 |

REFERENCE NUMERALS

1 Processing member
2 Rotor
3 Support tube
4 Storing vessel
5 Suction part
6 Suction room
7 Stirring room
9 Screen
10 Partition wall
11 Opening
12 Blade
13 Rotation axis
14 Motor
15 Stirring blade
18 Slit
19 Screen member
20 Second motor
21 Front-end part
22 Front side end surface
23 Area of front side end surface in inflow side
25 Back side end surface
28 Inflow opening
29 Outflow opening
30 Front-end action surface
31 Flank surface
32 Base-end part
Si Width of inflow opening in circumferential direction
So Width of outflow opening in circumferential direction

The invention claimed is:

1. A stirrer, comprising:
a rotor having a plurality of plate-like blades and rotating, a partition wall for holding a discharge pressure of the rotor, and a screen laid around the rotor, all of which are provided concentrically,
wherein the screen includes a plurality of slits in a circumferential direction and a screen member located between the adjacent slits,
wherein in the stirrer, in which by rotating at least the rotor of the rotor and the screen, a fluid to be processed is discharged as an intermittent jet flow from the inside of the screen to the outside through the slits, and
wherein a width of a front-end action surface in a front-end part of the blade in the rotation direction is narrower than a width of a base-end part of the blade in the rotation direction.

2. The stirrer according to claim 1, wherein the screen has a cylindrical shape having a circular cross-section,
wherein an opening of the plurality of the slits provided on an inner wall surface of the screen is made to serve as an inflow opening, and
wherein the width of the front-end action surface in the front-end part of the blade in the rotation direction is wider than a width of the inflow opening in the circumferential direction.

3. The stirrer according to claim 2, wherein the front-end part of the blade is defined by the front-end action surface and a flank surface,
wherein the front-end action surface is a surface which is provided on the very front-end of the blade such that the distance between the front-end action surface and the inner wall surface of the screen is kept minute, and
wherein the flank surface is a surface which is located behind the front-end action surface in the rotation direction of the blade and is provided such that the distance between the flank surface and the inner wall surface of the screen is larger than the minute distance.

4. The stirrer according to claim 3, wherein the number of the plurality of the plate-like blades is 3 or more and 12 or less.

5. The stirrer according to claim 2, wherein the plurality of the plate-like blades has the same width in the rotation direction in the front-end action surface and are formed at the equal distance in the rotation direction.

6. The stirrer according to claim 3, wherein the plurality of the plate-like blades has the same width in the rotation direction in the front-end action surface and are formed at the equal distance in the rotation direction.

7. The stirrer according to claim 2, wherein the number of the plurality of the plate-like blades is 3 or more and 12 or less.

8. The stirrer according to claim 2, wherein diameters of the blade and the screen become smaller in the axial direction.

9. The stirrer according to claim 3, wherein diameters of the blade and the screen become smaller in the axial direction.

10. The stirrer according to claim 1, wherein the blade has the front-end action surface, a front surface which is located in a front of the front-end action surface of the blade in the rotation direction, and a back surface which is located behind the front-end action surface of the blade in the rotation direction, and wherein the front surface and the back surface are slope-like tapered surfaces which gradually become smaller as the width between the front surface and the back surface move toward the front-end in the part more than half from the front-end side of the blade.

11. The stirrer according to claim 10, wherein the number of the plurality of the plate-like blades is 3 or more and 12 or less.

12. The stirrer according to claim 10, wherein diameters of the blade and the screen become smaller in the axial direction.

13. The stirrer according to claim 10, wherein the plurality of the plate-like blades has the same width in the rotation direction in the front-end action surface and are formed at the equal distance in the rotation direction.

14. The stirrer according to claim 1, wherein the number of the plurality of the plate-like blades is 3 or more and 12 or less.

15. The stirrer according to claim 14, wherein diameters of the blade and the screen become smaller in the axial direction.

16. The stirrer according to claim 1, wherein diameters of the blade and the screen become smaller in the axial direction.

17. The stirrer according to claim 1, wherein the plurality of the plate-like blades has the same width in the rotation direction in the front-end action surface and are formed at the equal distance in the rotation direction.

18. The stirrer according to claim 1, wherein the plurality of the slits has the same width in the circumferential direction and are formed at equal intervals in the circumferential direction, and wherein the screen does not to rotate.

19. The stirrer according to claim 1, wherein the plurality of the slits has the same width in the circumferential direction and are formed at equal interval in the circumferential direction, and wherein the screen rotates in opposite direction of the rotor.

20. A stirrer, comprising:

a rotor having a plurality of plate-like blades and rotating, and a screen laid around the rotor, all of which are provided concentrically, wherein the screen includes a plurality of slits in a circumferential direction and a screen member located between the adjacent slits, wherein in the stirrer, in which by rotating at least the rotor of the rotor and the screen, a fluid to be processed is discharged as an intermittent jet flow from the inside of the screen to the outside through the slit, wherein the plurality of the plate-like blades rotationally moves by the rotation of the rotor, wherein on the front surface side of the blade in the rotation direction, by increasing a pressure of the fluid to be processed, the fluid to be processed is discharged as an intermittent jet flow from the slit located in the front surface side of the blade, wherein on the back surface side of the blade, by decreasing the pressure of the fluid to be processed, the fluid to be processed is sucked from the slit located in the back surface side of the blade, wherein the front-end part of the blade is defined by the front-end action surface and a flank surface, wherein the front-end action surface is a surface which is provided on the very front-end of the blade such that the distance between the front-end action surface and the inner wall surface of the screen is kept minute distance, wherein the flank surface is a surface which is located behind the front-end action surface in the rotation direction of the blade and is provided such that the distance between the flank surface and the inner wall surface of the screen is larger than the minute distance, and wherein the blade is configured so as to be fester a suction velocity of the fluid to be processed by being provided with the flank surface on the front-end part as compared with the case that the flank surface is not provided on the front-end part.

* * * * *